US012343917B2

(12) United States Patent
Morel et al.

(10) Patent No.: US 12,343,917 B2
(45) Date of Patent: Jul. 1, 2025

(54) CLOSURE FOR A PRODUCT-RETAINING CONTAINER

(71) Applicant: NOMACORC LLC, Zebulon, NC (US)

(72) Inventors: Floriane Marie Gabrielle Morel, Marcq en Baroeul (FR); Olav Marcus Aagaard, Rotterdam (NL); Marc Anton Charles Thometschek, Zandvoorde (BE)

(73) Assignee: VINVENTIONS USA, LLC, Zebulon, NC (US)

( * ) Notice: Subject to any disclaimer, the term of this patent is extended or adjusted under 35 U.S.C. 154(b) by 0 days.

(21) Appl. No.: 15/657,583

(22) Filed: Jul. 24, 2017

(65) Prior Publication Data
US 2018/0037373 A1 Feb. 8, 2018

Related U.S. Application Data

(60) Provisional application No. 62/369,919, filed on Aug. 2, 2016.

(51) Int. Cl.
*B29C 48/06* (2019.01)
*B29C 48/00* (2019.01)
(Continued)

(52) U.S. Cl.
CPC .............. *B29C 48/06* (2019.02); *B29C 48/00* (2019.02); *B65D 39/00* (2013.01);
(Continued)

(58) Field of Classification Search
None
See application file for complete search history.

(56) References Cited

U.S. PATENT DOCUMENTS 5,317,047 A 5/1994 Sabate et al.
5,736,586 A * 4/1998 Bastioli .................. C08J 9/125
521/84.1

(Continued)

FOREIGN PATENT DOCUMENTS

CN 1362929 A 8/2002
CN 1505673 A 6/2004
(Continued)

OTHER PUBLICATIONS

Rinaudo, Marguerite, "Chapter 4: Materials Based on Chitin and Chitosan," Bio-Based Plastics: Materials and Applications (book), First Edition, 2014, John Wiley & Sons, Ltd., pp. 63-87.

(Continued)

*Primary Examiner* — Scott R. Walshon
(74) *Attorney, Agent, or Firm* — Withrow + Terranova, PLLC; Vincent K. Gustafson

(57) ABSTRACT

A closure for a product-retaining container is constructed for being inserted and securely retained in a portal-forming neck of said container. The closure comprises: a plastic material comprising at least one thermoplastic polymer; a plurality of particles comprising cork; and at least one processing aid. Optionally, one or more additives and/or blowing agents may be included. A method for manufacturing a closure comprises intimately combining multiple components, heating the resulting composition to form a melt, forming a closure precursor from the melt, and optionally cutting and/or finishing the closure precursor to form the closure.

36 Claims, 3 Drawing Sheets

(51) Int. Cl.
  *B65D 39/00* (2006.01)
  *C08J 9/00* (2006.01)
  *C08J 9/35* (2006.01)

(52) U.S. Cl.
  CPC ...... *B65D 39/0011* (2013.01); *B65D 39/0058* (2013.01); *C08J 9/0061* (2013.01); *C08J 9/35* (2013.01); *C08J 2201/03* (2013.01); *C08J 2207/00* (2013.01); *C08J 2300/22* (2013.01); *C08J 2499/00* (2013.01)

(56) References Cited

U.S. PATENT DOCUMENTS

| | | | | |
|---|---|---|---|---|
| 6,787,245 | B1* | 9/2004 | Hayes | B32B 27/36 428/480 |
| 8,063,163 | B2 | 11/2011 | Hatke et al. | |
| 2006/0057314 | A1* | 3/2006 | Ikeda | B32B 27/08 428/480 |
| 2007/0231554 | A1* | 10/2007 | Bastioli | A23K 40/20 428/219 |
| 2011/0097530 | A1* | 4/2011 | Gohil | D01F 6/84 428/36.92 |
| 2012/0107630 | A1* | 5/2012 | Krishnaswamy | B32B 27/08 525/437 |
| 2013/0203878 | A1* | 8/2013 | Igualada | C08J 9/127 521/85 |
| 2014/0224759 | A1 | 8/2014 | Aagaard et al. | |
| 2018/0142060 | A1* | 5/2018 | Lu | C08K 3/26 |

FOREIGN PATENT DOCUMENTS

| | | | |
|---|---|---|---|
| CN | 101549767 A | 10/2009 | |
| CN | 102387818 A | 3/2012 | |
| CN | 104487357 A | 4/2015 | |
| CN | 105713356 A * | 6/2016 | ............ C08G 63/06 |
| FR | 2799183 A1 | 4/2001 | |
| WO | 03018304 A1 | 3/2003 | |
| WO | WO-2006131767 A1 * | 12/2006 | ......... B65D 39/0011 |
| WO | 2016020361 A1 | 2/2016 | |

OTHER PUBLICATIONS

International Search Report and Written Opinion for International Patent Application No. PCT/US2017/043528, mailed Oct. 26, 2017, 13 pages.
International Preliminary Report on Patentability for International Patent Application No. PCT/US2017/043528, mailed Feb. 14, 2019, 8 pages.
Andrade e Silva, L.G, et al., Effect of Electron Beam Irradiation on the Biodegradability of Aromatic Aliphatic Copolyester Film and Their Blend with Corn Starch, International Nuclear Atlantic Conference: INAC 2009 Rio de Janiero, RJ, Brazil, Sep. 27 to Oct. 2, 2009, 8 pages.
First Office Action for Chinese Patent Application No. 201780048878. 4, mailed Dec. 31, 2020, 21 pages.
Office Action for Argentinian Patent Application No. 20170102173, mailed Jul. 2, 2021, 6 pages (machine translation).
Examination Report for European Patent Application No. 17746346. 0, mailed May 19, 2021, 7 pages.
Examination Report No. 1 for Australian Patent Application No. 2017305190, mailed Jul. 10, 2019, 3 pages.
Second Office Action for Chinese Patent Application No. 201780048878. 4, mailed Dec. 2, 2021, 12 pages.
Examination Report for European Patent Application No. 17746346. 0, mailed Jan. 20, 2023, 6 pages .
Safety Data Sheet for Stearamide, product code S0075, Revision 1, TCI America, Jul. 6, 2018 (5 pages).

* cited by examiner

CLOSURE FOR A PRODUCT-RETAINING CONTAINER

CROSS-REFERENCE TO RELATED APPLICATION(S)

This application is a non-provisional of U.S. Provisional Patent Application No. 62/369,919 filed on Aug. 2, 2016. The entire contents of the foregoing provisional application are hereby incorporated by reference as if set forth fully herein.

TECHNICAL FIELD

The present disclosure relates to a closure for a product-retaining container, to a composition for preparing a closure, to a method of preparing a closure for a product-retaining container, to a closure that is obtainable by a method of the present disclosure, and to a use of a closure for sealingly closing a product-retaining container.

BACKGROUND

In view of the wide variety of products that are sold for being dispensed from containers, particularly containers with round necks which define the dispensing portal, numerous constructions have evolved for container stoppers or closure means for the portals, including for example screw caps, stoppers, corks and crown caps, to name a few. Generally, products such as vinegar, vegetable oils, laboratory liquids, detergents, honey, condiments, spices, alcoholic beverages, and the like, have similar needs regarding the type and construction of the closure means used for containers for these products. However, wine sold in bottles represents the most demanding product in terms of bottle closure technology. In an attempt to best meet these demands, most wine bottle closures or stoppers have been produced from cork, a natural material.

While natural cork remains a dominant material for wine closures, wine closures made from alternative materials, such as polymers, also referred to as synthetic closures, have become increasingly popular, largely due to the shortage in high quality natural cork material and the awareness of wine spoilage as a result of "cork taint," a phenomenon that is associated with natural cork materials. Synthetic closures have the advantage that by means of closure technology, their material content and physical characteristics can be designed, controlled and fine-tuned to satisfy the varying demands that the wide range of different wine types produced throughout the world impose on closures.

One of the principal difficulties to which any bottle closure is subjected in the wine industry is the manner in which the closure is inserted into the bottle. Typically, the closure is placed in a jaw clamping member positioned above the bottle portal. The clamping member incorporates a plurality of separate and independent jaw members which peripherally surround the closure member and are movable relative to each other to compress the closure member to a diameter substantially less than its original diameter. Once the closure member has been fully compressed, a plunger moves the closure means from the jaws directly into the neck of the bottle, where the closure member is capable of expanding into engagement with the interior diameter of the bottle neck and portal, thereby sealing the bottle and the contents thereof.

In view of the fact that the jaw members are generally independent of each other and separately movable in order to enable the closure member to be compressed to the substantially reduced diameter, each jaw member comprises a sharp edge which is brought into direct engagement with the closure member when the closure member is fully compressed. Score lines are frequently formed on the outer surface of the closure member, which prevents a complete, leak-free seal from being created when the closure member expands into engagement with the bottle neck. This can occur, for example, if the jaw members of the bottling equipment are imperfectly adjusted or worn. Leakage of the product, particularly of liquid product, from the container can occur.

It is generally desirable that any bottle closure be able to withstand this conventional bottling and sealing method. Furthermore, many cork sealing members also incur damage during the bottling process, resulting in leakage or tainted wine.

Another issue in the wine industry is the capability of the wine stopper to withstand a pressure build up that can occur during storage of the wine product after it has been bottled and sealed. Due to natural expansion of the wine, for example during hotter months, pressure builds up, which can result in the bottle stopper being displaced from the bottle. As a result, it is generally desirable that the bottle stopper employed for wine products be capable of secure, intimate, frictional engagement with the bottle neck in order to resist any such pressure build up.

A further issue in the wine industry is the general desirability that secure, sealed engagement of the stopper with the neck of the bottle be achieved quickly, if not virtually immediately after the stopper is inserted into the neck of the bottle. During normal wine processing, the stopper is compressed, as detailed above, and inserted into the neck of the bottle to enable the stopper to expand in place and seal the bottle. Such expansion desirably occurs immediately upon insertion into the bottle since many processors tip the bottle onto its side or neck down after the stopper is inserted into the bottle neck, allowing the bottle to remain stored in this position for extended periods of time. If the stopper is unable rapidly to expand into secure, intimate, frictional contact and engagement with the walls of the neck of the bottle, wine leakage can occur.

It is further desirable that the closure be removable from the bottle using a reasonable extraction force. Although actual extraction forces extend over a wide range, the generally accepted, conventional extraction force is typically below 100 pounds (445 Newtons).

In achieving a commercially viable stopper or closure, a careful balance must be made between secure sealing and providing a reasonable extraction force for removal of the closure from the bottle. Since these two characteristics are believed to be in direct opposition to each other, a careful balance must be achieved so that the stopper or closure is capable of securely sealing the product, in particular the wine in the bottle, preventing or at least reducing both leakage and gas transmission, while also being removable from the bottle without requiring an excessive extraction force.

Furthermore, it is generally desirable to effectively prevent or reduce oxygen from entering the bottle. Too much oxygen can cause the premature spoilage of wine. In fact, oxidation may occur over a period of time to render the beverage undrinkable. Thus, it is generally desirable that the closure has a low oxygen permeability in order to extend and preserve the freshness and shelf life of the product. Any commercially viable wine stopper or closure should therefore generally have a low oxygen transfer rate (OTR). It is also possible to incorporate additives that act as oxygen scavengers into the closure. A combination of low closure permeability to oxygen and incorporation of oxygen scavengers can be effective at reducing oxygen-mediated spoilage of wine.

In addition to the above, it is also desirable, for economic and environmental reasons, to reduce the total amount of material in a closure made from materials such as polymers, particularly the amount of polymer material. Since the size of the closure is determined by the size of the bottle neck, reducing the amount of material can principally be achieved by reducing the density of the closure, in particular of the core member, which is generally in the form of a foamed material comprising air- or gas-filled cells. However, reducing the density of the core member generally increases the deformability of the core member and thus of the closure, which in turn results in a worsened sealing capability and increased leakage. In order to avoid this, a thicker and/or denser outer layer or skin is conceivable, as is the incorporation of a stiffer and/or denser central element within the core member. However, either of these approaches increases the total amount of material, thereby diminishing or even eliminating any advantages achieved by reducing the core density.

It is also possible to reduce the amount of polymer material by using filler material. Closures are known which incorporate fillers into a polymer matrix. For example, U.S. Pat. No. 5,317,047 describes a stopper made of expandable microspheres, cork powder, and a binder such as a polyurethane or acrylic type glue. The preparation method for closures incorporating cork powder in a polyurethane or acrylic matrix generally involves combining the cork powder with polyurethane or acrylic monomers, oligomers, or prepolymers, and polymerizing in situ. However, residual monomers and low molecular weight compounds such as dimers, trimers, and other oligomers, remain in the matrix and/or in the cork powder. These residual monomers and low molecular weight compounds may not be compatible with food safety considerations, since they can migrate into food products which are in contact with the closure. In addition, the methods usually require sustained application of heat over a period of hours in order to set and finish the glue.

It would be advantageous to be able to control the properties of a closure incorporating cork material, in the same way as a closure consisting principally of a single material such as polymer or cork. It would be particularly advantageous to be able to achieve homogeneous properties within such a closure. It would also be advantageous to be able to ensure that the desirable properties for such a closure, for example making it suitable as a closure for a wine bottle, as described herein, are achievable in industrial scale production without significant deviation for individual closures.

In addition to the above, it is often desirable for closures not made of cork to resemble natural cork closures as closely as possible in appearance. Both the longitudinal surface and the flat ends of cylindrical cork closures generally have an irregular appearance, for example showing naturally occurring irregularities in color, structure and profile. The same is true for non-cylindrical cork or cork-type closures, such as closures for champagne bottles. Methods have been developed for providing synthetic closures with a physical appearance similar to natural cork, for example by blending colors to produce a streaking effect in the outer portion of the closure, along the cylindrical axis, or to provide the flat terminating ends of a synthetic closure with a physical appearance similar to natural cork.

The cork industry generates large quantities of by-products, for example cork dust, cork powder and cork pieces, that are often considered waste products. It would be advantageous to transform these by-products into a high value composite product. It is known to incorporate cork materials into composites with polymers. The incorporation of cork particles into a polymer matrix can, however, be detrimental to the processing and performance properties thereof. Composites comprising large amounts of cork particles, for example more than about 50 wt. % cork particles, based on the total weight of the composite, tend to have properties such as hardness, density and permeability which make them unsuitable as closures for wine bottles. Crosslinkers and/or compatibilizers are often indicated in order to improve properties. However, crosslinkers and/or compatibilizers can raise issues of food safety when used in products which come into contact with foodstuffs. Moreover, cork can contain and release substances that affect the sensory perception of food when used in bulk or in composites as packaging material. Examples of such substances are sensory constituents such as haloanisoles, in particular, but not exclusively, trichloroanisole (TCA). In addition, a closure containing the cork should have good mechanical properties. It would be advantageous for a closure to overcome these problems as far as possible.

Production methods for composite closures comprising cork have so far been limited largely to moulding methods, in particular reactive moulding methods, where cork is combined with monomer or pre-polymer units which are then polymerized in situ in a mould, compression moulding methods, or a combination of compression moulding and reactive moulding methods, largely because of the difficulties often associated with moulding and extrusion methods that use thermoplastic polymers. These difficulties can include achieving a sufficient degree of foaming and/or a sufficient uniformity of foaming and thus a desired low and uniform polymer foam density, as well as achieving a homogeneous distribution of cork particles. It can also be difficult to obtain a cylindrical extrudate with a smooth polymer surface which is not subject to surface melt fracture or undesired surface roughness. If increasing amounts of cork are incorporated, any difficulties and disadvantages in processing and performance are exacerbated. Composites comprising large amounts of smaller particles, for example cork powder, such as more than about 50 wt. % of cork powder, based on the total weight of the composite, tend to have properties such as hardness, density and permeability which make them unsuitable as closures for wine bottles. Crosslinkers are often required in order to improve properties. However, crosslinkers can raise issues of food safety when used in products which come into contact with foodstuffs. Composites comprising larger particles, for example cork granules, can have the disadvantage that the cork granules in the matrix contribute to, or even dominate, the mechanical and permeability properties of the composite, with one result being that these properties are not uniform throughout the composite. In order to be usable as closures for wine bottles, substantially uniform properties throughout the closure are desirable.

Closures incorporating cork material in a synthetic matrix have been previously described. For example, FR 2 799 183 describes synthetic closures consisting of a mixture of cork granulate and cork powder in a polyurethane matrix. The mixture of cork granulate and cork powder is said to be necessary for the homogeneity of the closure. However, the properties of such closures are generally not homogeneous throughout because of the presence of different "zones"

comprising either cork or polyurethane. This can be difficult to avoid in moulding processes because of the inherent lack of mixing of components within the mould. This is exacerbated by the fact that coating of cork particles with glue is done by mixing the components at low shear rates and low temperatures. These conditions are necessary in order not to cure the glue prematurely. However, these conditions lead to poor mixing and can create clusters of cork or glue. Furthermore, such closures can crumble and even fall apart because of weaknesses in the matrix arising from the incorporation of larger cork granules and/or the presence of clusters of cork particles which are to a certain extent devoid of binder. It would be advantageous to be able to mix at high shear and/or high temperature which is something which could not be done with glue because it would cure the glue prematurely. High-shear mixing is better than low-shear mixing to provide a good homogeneous blend of particles in the polymer.

Furthermore, it can be more difficult to remove haloanisoles, in particular trichloroanisole (TCA) and other anisoles that can cause organoleptic problems, such as tribromoanisole (TBA), tetrachloroanisole (TeCA) and pentachloroanisole (PCA), from larger pieces of cork, such as cork granules compared to cork powder, so that closures including such larger cork granules might risk the problem of so-called cork taint to a greater extent than those including cork powder. This can, however, be largely or entirely overcome by suitable cleaning methods. As the ease of cleaning is expected to increase with smaller particle sizes, it still remains easier to remove organoleptically active substances from cork granules than from traditional closures made from a single piece of natural cork.

For these reasons, it would be advantageous to be able to produce closures comprising pieces of natural cork, in particular cork particles, wherein the cork particles are embedded in a polymer matrix, which do not suffer from the problems of either natural corks or known cork-polymer composite closures.

In addition to the above, it is also desirable, for environmental reasons, that closures made from alternative materials such as polymers be biodegradable, recyclable, compostable, or derived from renewable resources, to the greatest extent possible. Biodegradability and compostability can be measured by standard test methods such as, for example, DIN EN 13432 or ASTM D6400, and in compliance with relevant EU and USA legislation and guidelines, or, for example, the Japanese GreenPla standard for compostable and biodegradable polymers. Biodegradable, recyclable and compostable objects can be, but need not be, made entirely from non-fossil resources. In fact, in addition to polymers derived from natural or renewable sources, which can be synthetic or natural polymers, there are also available polymers made from fossil resources that can be metabolized, for example by microorganisms, due to their chemical structure. Some polyesters, such as poly(caprolactone) or poly(butylenadipate-co-terephthalate), are made from fossil resources and yet are biodegradable.

It is, furthermore, often desirable to provide decorative indicia such as letters and ornaments on the surface of wine stoppers, such as the crest or emblem of a winery. Natural corks are generally marked by a method commonly referred to as "fire branding," i.e., by the application of a hot branding tool. Alternatively, natural corks may also be branded or printed by application of colors or dyes. Due to food safety concerns, marking of natural corks with colors or dyes is generally only effected on the curved peripheral surface of the cork that is not in direct contact with the wine. Marking on the flat terminating surfaces of natural corks is generally effected by means of fire branding only since this method does not impose any food safety concerns.

It is also known to brand synthetic closures. These closures are commonly branded by means of inkjet or offset printing using special dyes or colors approved for indirect food contact. Since such colors and dyes are normally not approved for direct food contact, marking of closures with colors or dyes is generally only effected on the curved cylindrical surface—the peripheral surface—of the closure that is not in direct contact with the wine. Such marking can be on the outermost surface, or on an inner surface which is subsequently covered with an outer, preferably at least partially transparent, layer. Marking on the flat terminating surfaces of closures made from alternative materials such as polymers is generally better known for injection molded closures, where marking is effected during the molding process of the closure by providing raised portions on the flat terminating surfaces.

Methods are available for marking the flat terminating surface of closures from alternative materials such as polymers. Laser marking may, in theory, be a feasible method since it allows the avoidance of direct food contact. This method can allow in line printing, for example of closures that have been manufactured by means of extrusion. A further method involves the application of a decorative layer, in particular a decorative polymer layer, to a flat terminating surface, by means of heat and/or pressure transfer. This method allows for permanent branding of synthetic closures without giving rise to concerns relating to food safety and without negatively impacting the gas permeation and/or mechanical properties of synthetic closures, in particular of co-extruded synthetic closures.

It is possible that closures with a high proportion of synthetic material are not allowed to be used for certain type of wines which have described natural cork as the choice of closure material. According to European Union Council of Europe Resolution ResAP(2004)2 on cork stoppers and other cork materials and articles intended to come into contact with foodstuffs, for example, a closure may be defined as a cork closure if it includes a minimum of 51% w/w cork. The inclusion of 51% w/w cork in a closure can thus be advantageous in opening up a wider market for its use. In contrast to natural cork closures, synthetic closures often cannot be reinserted into a bottle, or only with some difficulty, once they have been removed. It would therefore be advantageous to provide a closure, having a synthetic component, that can be reinserted into a bottle once it has been removed.

Therefore, there exists a need for a closure or stopper which particularly comprises at least one of the characteristic features described above, said closure or stopper preferably having a physical appearance and/or tactile characteristics similar in at least one aspect to a natural cork closure, said closure preferably being biodegradable, particularly with only minimal impairment, particularly with no impairment or even with improvement of the other properties of the closure such as, inter alia, OTR, leakage, ease of insertion and removal, compressibility and compression recovery, and/or compatibility with food products.

Other and more specific needs will in part be apparent and will in part appear hereinafter.

SUMMARY

The closure of the present disclosure may be employed as a bottle closure or stopper for any desired product. However, for the reasons detailed above, wine products impose the most burdensome standards on a bottle closure. Consequently, in order to demonstrate the universal applicability of the closure of the present invention, the following disclosure focuses on the applicability and usability of the closure of the present invention as a closure or stopper for wine containing bottles. This discussion is for exemplary purposes only and is not intended as a limitation of the present disclosure.

As discussed above, a bottle closure or stopper for wine must be capable of performing numerous separate and distinct functions. One principal function is the ability to withstand the pressure build up due to temperature variations during storage, as well as prevent any seepage or leakage of the wine from the bottle. Furthermore, a tight seal must also be established to prevent unwanted gas exchange between ambient conditions and the bottle interior, so as to prevent any unwanted oxidation or permeation of gases from the wine to the atmosphere. In addition, the unique corking procedures employed in the wine industry impart substantial restrictions on the bottle closure, requiring a bottle closure which is highly compressible, has high immediate compression recovery capabilities and can resist any deleterious effects caused by the clamping jaws of the bottle closure equipment. In view of environmental considerations, it would be an advantage to be able to provide a closure that is at least partially biodegradable, compostable or recyclable. The tactile properties and/or the physical appearance should preferably be similar to a natural cork closure. The contained product should not be spoiled by the closure. Additionally, it would be advantageous for a closure to be easily extractable and reinsertable. A further advantage would be to be able to print or brand a closure as if it were a cork closure.

Although prior art products have been produced in an attempt to satisfy the need for alternative bottle closures employable in the wine industry, such prior art systems have often been found lacking in one or more of the generally desirable aspects of a bottle closure for wine products. However, by employing the present disclosure, many of the prior art disadvantages have been reduced or even obviated and an effective, easily employed, mass-produced closure has been realized.

In the present disclosure, many of the prior art disadvantages can be reduced or even overcome by achieving a cork composite closure for a product-retaining container constructed for being inserted and securely retained in a portal forming neck of said container and a method for producing such a synthetic closure.

In accordance with the present disclosure, a closure is provided that comprises at least one thermoplastic polymer and a plurality of particles comprising cork. If at least one biodegradable polymer is comprised as a thermoplastic polymer, the closures of the invention can be biodegradable, or at least a part of the closure content can be biodegradable. The closures of the invention thus have the potential for improved environmental friendliness compared to known synthetic closures. Desirable closure properties such as oxygen permeability, compressibility and recovery capabilities are largely unaltered or even improved compared to a synthetic closure not comprising cork particles. The sealing properties of the closure are also substantially not affected by the incorporation of cork particles. At the same time, the extraction force required to remove the closure from the bottle is not altered substantially. The closure can more easily be reinserted into a bottle after opening, and may have printability approaching or the same as that of natural cork.

In addition, the closure resembles a natural cork closure in its physical appearance. Furthermore, the tactile properties of the closure are very similar to a closure from natural cork.

In one aspect the present disclosure provides for a closure for a product-retaining container constructed for being inserted and securely retained in a portal-forming neck of said container, wherein the closure comprises:
(a) a plastic material comprising one or more thermoplastic polymers;
(b) a plurality of particles comprising cork, the particles having a particle size distribution $D_{50}$ measured by means of mechanical sieving according to ISO ICS 19.120 in the range of from 0.20 millimeters to 10 millimeters;
(c) one or more processing aids.

The closure of the invention preferably has a substantially cylindrical form. A cylindrical closure comprises a substantially cylindrical peripheral surface and two substantially flat terminating faces at the opposing ends of the cylindrical form. Alternatively, the closure of the invention can be in the form of a closure for a champagne or sparkling wine bottle. This form is well known to the skilled person. The ends of the inventive closure can be beveled or chamfered, as is known from the prior art. Although any desired bevel or chamfered configuration can be employed, such as a radius, curve, or flat surface, it has been found that merely cutting the terminating ends at the intersection with the longitudinal cylindrical surface of the elongated length of material at an angle in the range of from about 30° to about 75°, for example in the range of from about 35° to about 70°, particularly in the range of from about 40° to about 65°, allows formation of a closure which is easier to insert into the neck of a container. Angles of about 45°, 46°, 47°, 48°, 49°, 50°, 51°, 52°, 53°, 54°, 55°, 56°, 57°, 58°, 59° or 60° have been found particularly to contribute to the present disclosure. The bevel or chamfer angle is measured relative to the longitudinal axis of the cylindrical closure. The chamfer angle for a closure for a still wine bottle is particularly within the above ranges, particularly with a chamfer length in the range of from about 0.4 mm to about 2.5 mm, particularly in the range of from about 0.5 mm to about 2.0 mm. Closures for sparkling wine bottles advantageously have a chamfer in the above range, but generally have a deeper and/or longer chamfer than closures for still wine bottles, for example having a chamfer angle in the range of from about 35° to about 55°, particularly in the range of from about 40° to about 50°, more particularly a chamfer angle of about 40°, 41°, 42°, 43°, 44°, 45°, 46°, 47°, 48°, 49° or 50°, and/or a chamfer length in the range of from about 3 mm to about 8 mm, particularly in the range of from about 4 mm to about 7 mm, particularly a chamfer length of about 3 mm, 4 mm, 5 mm, 6 mm, 7 mm or 8 mm. In addition, an end cap can be attached to one or both of said flat terminating surfaces of the closure. Said end cap can be made from any material, preferably from a plastic material. Preferably, the end cap has a circular cross-section with a diameter larger than the diameter of the closure.

The closure may have a construction comprising a single component. This component may be referred to as the closure or as a core member. If the closure comprises more than one component, it may be referred to as a multi-component closure or a multi-layer closure. A multi-component closure preferably has a construction comprising a core member, which corresponds to the closure or the core member of the single-component closure, and additionally one or more peripheral layers at least partially surrounding and intimately bonded to the peripheral surface of the core member. According to this embodiment of the disclosure, the closure comprises
    a) a core member comprising at least one thermoplastic polymer, and
    b) at least one peripheral layer at least partially surrounding and intimately bonded to at least one surface of the core member, said peripheral layer comprising at least one thermoplastic polymer. This construction can be preferred for cylindrical closures. An alternative type of closure comprising plural components can comprise a construction such that a core member as described herein is provided with a disc, for example a disc made from natural cork, at one or both flat terminating ends. The disc or discs, if present, completely cover one or both of the terminating ends of the closure. In the case of a cylindrical closure, such as are generally used for still wine bottles, the core member is in the form of a cylinder and the terminating ends are the flat terminating ends of the cylinder. In the case of a closure for a sparkling wine bottle, a disc, if comprised, preferably covers the terminating end of the closure that faces towards the interior of the bottle. A second disc facing the exterior of the bottle is also conceivable.

In the present disclosure, the disclosure relating to a "core member" is intended to mean a single component closure and/or a core member of a multi-component closure. References herein to a "closure" encompass single component closures and multi-component closures, as well as core members of multi-component closures, because core members of multi-component closures and single component closures are generally identical in the presently disclosed closures, having the same composition and the same properties and characteristics, and generally being formed in the same way. Any details herein regarding a core member thus apply to a single component closure, and any details herein regarding a closure or a single component closure likewise apply to a core member. In particular, any reference herein to a core member applies to the entirety of a single component closure. References to the "plastic material" are generally intended to mean the plastic material of the core member, or of a single component closure, although the disclosure relating to plastic material can also apply to the material of a peripheral layer. Where indicated herein, the details regarding the plastic material can also apply to a peripheral layer, if present.

The closure of the present invention preferably comprises a plurality of cells. In particular the plastic material preferably comprises a plurality of cells. In particular the plastic material preferably comprises a polymer matrix comprising a plurality of cells. Preferably the plastic material forms a polymer matrix comprising a plurality of cells. Natural cork comprises a plurality of cells. A plurality of cells is thus already comprised in the cork particles. A plurality of cells according to the invention is preferably also comprised in the plastic material. A plurality of cells can be comprised, for example, in a foamed plastic material, also referred to as a foam, as a foam polymer, as a foam plastic material, as a plastic foam, as a polymer foam, as a foamed polymer, as a foamed polymer material, or as a foamed plastic. The plastic material is preferably in the form of a foam. The closure according to the present disclosure particularly comprises at least one foamed plastic material. The foamed plastic material preferably forms a polymer matrix comprising a plurality of cells. The polymer matrix preferably forms a continuous phase in which the plurality of cork particles is embedded. A peripheral layer, if present, can also comprise a plurality of cells, for example in the form of an at least partially foamed material. A peripheral layer, if present, may be formed with a substantially greater density than the core material, in order to impart desired physical characteristics to the bottle closure of the present disclosure. According to an exemplary aspect of the present disclosure, the core member is foamed and at least one peripheral layer, if a peripheral layer is present, is substantially not foamed, particularly not foamed. It is also conceivable for a peripheral layer, if present, to be foamed. A peripheral layer may be foamed in the same way as the core member, or to a lesser extent, for example by means of a smaller amount of foaming agent or expandable microspheres in the peripheral layer, for example to make it more flexible. However, a peripheral layer, if present, advantageously has a higher density than the core member.

It is preferred that the plurality of cells comprised in the closure is a plurality of substantially closed cells, in particular is a plurality of closed cells. The cells comprised in natural cork are closed cells or substantially closed cells. It is particularly preferred that the plurality of cells comprised in the plastic material is a plurality of substantially closed cells, in particular a plurality of closed cells. In particular it is preferred that the plastic material comprises a polymer matrix comprising a plurality of cells, and the plurality of cells in the polymer matrix is a plurality of substantially closed cells, in particular a plurality of closed cells. By "substantially closed cells" is meant that while the great majority, for example more than 90%, preferably more than 95%, preferably more than 99% of the cells in the plurality of cells are closed cells, some of the cells in the plurality of cells, for example up to 10%, preferably less than 5%, preferably less than 1%, may be open cells. The plurality of cells of the disclosed closure is thus further advantageously defined as being a plurality of substantially closed cells, or that the foam is a substantially closed cell foam. Closed cell foams are generally defined as comprising cells, also referred to as pores, which are substantially not interconnected with each other. Closed cell foams have higher dimensional stability, lower moisture absorption coefficients, and higher strength compared to open-cell-structured foams. A foamed peripheral layer, if present, preferably comprises substantially closed cells.

The plurality of cells, in particular the plurality of cells comprised in the plastic material, preferably has an average cell size in a range of from about 0.025 mm to about 0.5 mm, in particular from about 0.05 mm to about 0.35 mm. Average cell sizes in the plastic material can also be from about 0.05 mm to about 0.3 mm, from about 0.075 mm to about 0.25 mm, preferably from about 0.1 mm to about 0.25 mm, preferably from about 0.1 mm to about 0.2 mm. The average cell size is measured according to standard test methods known to the skilled person, preferably be means of microscopy.

In order to ensure that the core member or the closure possesses inherent consistency, stability, functionality and capability of providing long-term performance, the cell size and/or cell distribution of the plurality of cells is preferably substantially homogeneous throughout the entire length and diameter of the core member or the closure, in particular throughout the entire plastic material. In this way closures and core members with substantially uniform properties, such as, for example OTR, compressibility and compression recovery, can be provided. It is preferred that at least one of the size and the distribution of the plurality of cells in the closure or in the core member is substantially uniform throughout at least one of the length and the diameter of the closure. Particularly preferably, at least one of the size and the distribution of the plurality of cells comprised in the foam plastic material is substantially uniform throughout at least one of the length and the diameter of the closure or the core member, preferably throughout the plastic material comprised in the closure or the core member. Such a uniformity contributes to the homogeneity of the closure or the core member, in respect of both structural stability and performance properties. It also contributes to a homogeneous distribution of the cork particles throughout the closure or the core member, by providing a uniformly supporting polymer matrix and avoiding clustering or clumping together of cork particles, which could be caused, for example by localized weak spots in the polymer matrix.

In another exemplary aspect of the present disclosure, the core member or the closure, in particular the plastic material, comprises closed cells having at least one of an average cell size ranging from about 0.02 millimeters to about 0.50 millimeters and a cell density ranging from about 8,000 cells/cm$^3$ to about 25,000,000 cells/cm$^3$. Although this cell configuration has been found to produce a highly effective product, it has been found that even more advantageous products are those wherein said core member comprises closed cells having at least one of an average cell size ranging from about 0.05 mm to about 0.1 mm and a cell density ranging from about 1,000,000 cells/cm$^3$ to about 8,000,000 cells/cm$^3$. Preferably the particles in the plurality of particles, in particular the cork particles, have an average cell size in the range of from 0.02 mm to 0.05 mm and a cell density in the range of from $4\times10^7$ to $20\times10^7$ cells/cm$^3$. Preferably the plastic material has average cell size in a range of from about 0.025 mm to about 0.5 mm, in particular in the range of from about 0.05 mm to about 0.35 mm, preferably in the range of from about 0.05 mm to about 0.3 mm, preferably in the range of from about 0.075 mm to about 0.25 mm, preferably in the range of from about 0.1 mm to about 0.25 mm, preferably in the range of from about 0.1 mm to about 0.2 mm and a cell density in the range of from $1.8\times10^6$ to $5\times10^6$ cells/cm$^3$.

The closure of the present invention can be formed by means of extrusion or moulding. In known closures formed from thermoplastic polymers by means of extrusion or moulding, the synthetic component, or the polymer, is generally foamed by means of a blowing agent, also referred to as a foaming agent. It is well known in the industry to employ a blowing agent in forming plastic material, for example extruded or moulded foam plastic material, such as is advantageous for the closure. In the present disclosure, a variety of blowing agents can be employed during the manufacturing process to produce the closure. Typically, either physical blowing agents or chemical blowing agents, or a combination of physical and chemical blowing agents, are employed. Expandable microspheres can also be used. The blowing agent used in formation of the inventive closure can be selected from the group consisting of expandable microspheres, chemical blowing agents, physical blowing agents, and combinations of two or more thereof. Particularly preferably, the blowing agent comprises or is expandable microspheres.

Chemical blowing agents include azodicarbonamic, azodicarbonamide, azodiisobutyro-nitride, benzenesulfonhydrazide, 4,4-oxybenzene sulfonylsemicarbazide, p-toluene sulfonylsemicarbazide, barium azodicarboxlyate, N,N'-Dimethyl-N,N'-dinitrosoterephthalamide, and trihydrazinotriazine. An example of a suitable chemical blowing agent is sold by Clamant International Ltd, BU Masterbatches (Rothausstr. 61, 4132 Muttenz, Switzerland) under the trade name Hydrocerol®.

Alternatively, or in addition to, a chemical blowing agent, it is possible for an inorganic, or physical, blowing agent to be used in making the closure according to the present disclosure. Examples of physical blowing agents include carbon dioxide, water, air, helium, nitrogen, argon, and mixtures thereof. Carbon dioxide and nitrogen are particularly useful blowing agents.

Suitable physical blowing agents that have been found to be efficacious in producing the closure of the present disclosure can comprise one or more selected from the group consisting of: aliphatic hydrocarbons having 1-9 carbon atoms, halogenated aliphatic hydrocarbons having 1-9 carbon atoms and aliphatic alcohols having 1-3 carbon atoms. Aliphatic hydrocarbons include methane, ethane, propane, n-butane, isobutane, n-pentane, isopentane, neopentane, and the like. Among halogenated hydrocarbons and fluorinated hydrocarbons they include, for example, methylfluoride, perfluoromethane, ethyl fluoride, 1,1-difluoroethane (HFC-152a), 1,1,1-trifluoroethane (HFC-430a), 1,1,1,2-tetrafluoroethane (HFC-134a), pentafluoroethane, perfluoroethane, 2,2-difluoropropane, 1,1,1-trifluoropropane, perfluoropropane, perfluorobutane, perfluorocyclobutane. Partially hydrogenated chlorocarbon and chlorofluorocarbons for use in this disclosure include methyl chloride, methylene chloride, ethyl chloride, 1,1,1-trichlorethane, 1,1-dichloro-1-fluoro ethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC11), dichlorodifluoromethane (CFC-12), trichlorotrifluoroethane (CFC-113), dichlorotetrafluoroethane (CFC-114), chloroheptafluoropropane, and dichlorohexafluoropropane. Fully halogenated chlorofluorocarbons are not preferred due to their ozone depletion potential. Aliphatic alcohols include methanol, ethanol, n-propanol and isopropanol.

If a chemical and/or physical blowing agent is employed, in order to control the cell size in the closure, in particular in the plastic material, and attain the desired cell size detailed herein, a nucleating agent is often employed during foaming of the plastic material. Preferred nucleating agents are selected from the group consisting of calcium silicate, talc, clay, titanium oxide, silica, barium sulfate, diatomaceous earth, and mixtures of citric acid and sodium bicarbonate, which enable the desired cell density and cell size to be achieved. In a particular embodiment of the present invention, it has been found that a nucleating agent, such as one of those listed herein, may be employed. Cork particles can also act as nucleating agent.

If a chemical or physical blowing agent is used, or a combination of one or more chemical blowing agents and one or more physical blowing agent, the blowing agent or agents may be incorporated into the plastic material in an amount ranging from about 0.005 wt. % to about 10 wt. %, based on the total weight of the plastic material.

In order to achieve the objects of the invention, the plurality of cells is preferably obtained by using expandable microspheres as blowing agent. Expandable microspheres consist of a thin thermoplastic shell, usually made from a copolymer of monomers such as vinylidene chloride, acrylonitrile and/or methyl methacrylate, that encapsulates a low boiling point liquid hydrocarbon blowing agent, typically isobutene or isopentane. When heated, the polymeric shell gradually softens, and the hydrocarbon expands, thereby increasing the internal pressure inside the microsphere and causing the polymeric shell to expand. When the heat is removed, the shell stiffens and the microsphere remains in its expanded form. When fully expanded, the volume of the microspheres can increase by more than 40 times, potentially up to 60 to 80 times. It is believed that in the closures of the present invention the thermoplastic polymer or polymers of the micro sphere shell are fused into the polymer matrix while maintaining the integrity of the microsphere or the expanded microsphere, and thus form at least a part of the cell walls of the plurality of cells in the polymer matrix. The cell walls that define the cells in the plurality of cells and face the interior of the respective cell are believed to comprise predominantly the thermoplastic polymer or polymers of the expandable microspheres' shells. In this way, at least one cell in the plurality of cells comprised in the plastic material is defined by at least one cell wall facing the interior of the cell, the plastic material of at least a part of the cell wall comprising a different thermoplastic polymer composition compared to the plastic material forming the remainder of the polymer matrix. Preferably, the cells in the plurality of cells comprised in the plastic material are defined by cell walls, the plastic material of the cell walls facing the interiors of the cells comprising a different thermoplastic polymer composition compared to the plastic material forming the remainder of the polymer matrix. If thermoplastic expandable microspheres are used, a nucleating agent as described herein need not be employed, preferably is not employed. Particularly preferably a nucleating agent is not added to the composition from which the closure is formed.

Expandable microspheres may be comprised in the composition used to form the closure in an amount ranging from about 0.005 wt. % to about 10 wt. %, preferably in an amount ranging from about 0.05 wt. % to about 10 wt. %, preferably in an amount ranging from about 0.5 wt. % to about 10 wt. %, preferably in an amount ranging from about 1.0 wt. % to about 10 wt. %, preferably in an amount ranging from about 1.0 wt. % to about 8 wt. %, preferably in an amount ranging from about 1.0 wt. % to about 5 wt. %, preferably in an amount ranging from about 1.0 wt. % to about 4 wt. %, or in an amount ranging from about 1.5 wt. % to about 4.0 wt. %, based on the total weight of the composition. Accordingly, the closure comprises expanded microspheres in an amount ranging from about 0.005 wt. % to about 10 wt. %, preferably in an amount ranging from about 0.05 wt. % to about 10 wt. %, preferably in an amount ranging from about 0.5 wt. % to about 10 wt. %, preferably in an amount ranging from about 1.0 wt. % to about 10 wt. %, preferably in an amount ranging from about 1.0 wt. % to about 8 wt. %, preferably in an amount ranging from about 1.0 wt. % to about 5 wt. %, preferably in an amount ranging from about 1.0 wt. % to about 4 wt. %, or in an amount ranging from about 1.5 wt. % to about 4.0 wt. %, based on the total weight of the plastic material. Expandable microspheres may be used in combination with one or more blowing agents selected from chemical blowing agents and physical blowing agents, or expandable microspheres may be used as the sole foaming agent, in the absence of one or more blowing agents selected from chemical blowing agents and physical blowing agents. In the absence of a blowing agent such as a chemical blowing agent and/or a physical blowing agent, the cells in the foam are substantially formed from the expandable microspheres. In this case, the amount of expandable microspheres is preferably sufficient to achieve the desired foam density of the plastic material. If expandable microspheres are used as foaming agent in the absence of a chemical or physical blowing agent, a nucleating agent is not used and the composition used to form the closure does not comprise a nucleating agent. If a combination of expandable microspheres with one or more chemical and/or physical blowing agents is used, the composition can comprise a nucleating agent.

The closure according to the invention preferably has an overall density in the range of from 100 kg/m$^3$ to 500 kg/m$^3$, preferably in the range of from about 125 kg/m$^3$ to 500 kg/m$^3$, preferably in the range of from about 150 kg/m$^3$ to 500 kg/m$^3$, preferably in the range of from about 150 kg/m$^3$ to 480 kg/m$^3$, preferably in the range of from about 150 kg/m$^3$ to 450 kg/m$^3$, preferably in the range of from about 175 kg/m$^3$ to 450 kg/m$^3$, or in the range of from about 200 kg/m$^3$ to 420 kg/m$^3$, or in the range of from about 200 kg/m$^3$ to 400 kg/m$^3$. The overall density takes into account the density of the cork particles, which is generally in the range of from about 150 kg/m$^3$ to 280 kg/m$^3$, typically in the range of from about 180 kg/m$^3$ to 280 kg/m$^3$, often about 180 kg/m$^3$. The plastic material preferably has a density in the range of from about 25 kg/m$^3$ to 800 kg/m$^3$, preferably in the range of from about 50 kg/m$^3$ to 800 kg/m$^3$, preferably in the range of from about 75 kg/m$^3$ to 800 kg/m$^3$, preferably in the range of from about 100 kg/m$^3$ to 800 kg/m$^3$, preferably in the range of from about 150 kg/m$^3$ to 700 kg/m$^3$, preferably in the range of from about 150 kg/m$^3$ to 600 kg/m$^3$, preferably in the range of from about 150 kg/m$^3$ to 500 kg/m$^3$, preferably in the range of from about 180 kg/m$^3$ to 500 kg/m$^3$, or in the range of from about 200 kg/m$^3$ to 450 kg/m$^3$, preferably in the range of from about 200 kg/m$^3$ to 420 kg/m$^3$. These density ranges allow the closure to attain desired closure properties as disclosed herein.

It has been found that in known closures and methods for production of closures, in particular extrusion methods, achieving a desired, homogeneous foam density using selected chemical and/or physical blowing agents can be detrimentally affected by the presence of large amounts, such as greater than about 40 wt. %, based on the total closure weight, of cork particles. It is believed that the cork particles may in some way detrimentally affect the formation of a homogeneous foam with a density in the desired range, when using selected conventional chemical or physical blowing agents. While chemical and/or physical blowing agents may be used according to the invention, it has been found that the use of expandable microspheres generally results in a foam having the desirable properties. In a preferred aspect of the inventive closure, expandable microspheres are used as foaming agent. In this aspect, no additional chemical or physical blowing agent and no added nucleating agent is employed, particularly no additional chemical or physical blowing agent and no added nucleating agent is added to the composition used to form the closure.

One of the difficulties associated with incorporating cork particles into an extruded or moulded polymer matrix of the sort described herein, particularly in larger amounts, for example where greater than about 40% by weight of cork particles is comprised, is in embedding the particles in the polymer matrix so that a smooth, continuous peripheral surface is achieved, without protruding pieces of cork and without discontinuous or rough areas on the peripheral surface. This is a particular problem with extruded parts, because the peripheral surface of the polymer matrix can catch and drag where it contacts the extrusion equipment, resulting in an uneven surface. While a certain amount of surface roughness can be smoothed by means of sanding, for example as is done with natural cork closures, this adds an additional process step, as well as generating extra waste, which cannot always be recycled but must be disposed of. In addition, if surface roughness increases, any sanding step must remove more material, which can also require that the extrudate includes more material, e.g. a wider diameter, to accommodate the greater amount of sanding. The present invention makes it possible to achieve a cylindrical extrudate or a moulded part in the form of a cylinder or a sparkling wine closure, with a smooth, continuous peripheral surface, or with a small degree of surface roughness that can be removed by sanding, preferably wherein the smooth, continuous peripheral surface comprises the plastic material, even when more than 50 wt. % of cork particles are comprised. The plurality of particles may form part of the peripheral surface. This can be advantageous inter alia in terms of appearance of the closure. In this case the plurality of particles, and in particular individual particles or groups of particles, preferably do not protrude from the peripheral surface. Accordingly, it is preferred that the closure of the present invention is cylindrical, or is in the form of a sparkling wine closure, and comprises a peripheral surface, wherein the peripheral surface preferably comprises a smooth surface comprising plastic material and particles comprising cork, or comprises a smooth, continuous surface of plastic material.

An advantage of the closures, compositions and methods defined herein is that they allow the prevention or elimination of surface melt fracture, also sometimes referred to as sharkskin, in an extruded closure. While the exact causes of surface melt fracture are a matter of debate in the scientific literature, it appears that surface melt fracture can occur in extruded polymer melts as a function of extrusion rates, with higher extrusion rates resulting in a greater degree of surface melt fracture. At a lower degree of surface melt fracture, surface irregularities are less pronounced and may appear as surface roughness. Higher degrees of surface melt fracture result in significant surface deformities and fracturing, fissuring or breaking of the extrudate surface, which is not always restricted to the surface but can extend to a significant depth within the extrudate. Such a high degree of deformation would prevent the use of such an extrudate as a closure. Polymer matrices with a high load of cork particles, for example greater than 40 wt. % cork particles, or greater than 50 wt. % cork particles, based on the total weight of the formulation, are susceptible to melt stress fracture. This significantly affects the available window of processing parameters for the production of extruded cylindrical closures such as those defined herein. The present invention permits the reduction or substantially the elimination of surface melt fracture, while maintaining commercially and technically advantageous production methods and processing parameters.

An advantageous aspect of the closure according to the present invention is that the distribution of the plurality of particles in the closure is substantially uniform throughout at least one of the length and the diameter of the closure. This prevents areas of weakness within the closure, for example regions comprising substantially cork particles without sufficient plastic material to form a supporting matrix, which can result in crumbling and breaking of the closure. The present invention achieves this by the selection of composition components, in particular the combination of plastic material and processing aid. The use of expandable microspheres as foaming agent is also believed to contribute to achieving this advantage, for example by contributing to the formation of a homogeneous, stable cellular polymer matrix that is capable of supporting an even distribution of the cork particles throughout the matrix. The exact composition used can vary within the parameters and ranges disclosed herein.

The closure of the invention may be formed by means of moulding, for example injection moulding or compression moulding, particularly compression moulding, or by means of extrusion. Preferably the closure is formed by means of extrusion. Extrusion permits a convenient, reliable, continuous mass production of closures including polymer components. One of the advantages of the present invention is that it makes it possible to manufacture closures by means of extrusion, in contrast to many of the known methods, which are only possible using discontinuous moulding techniques.

According to a preferred embodiment, the closure of the invention does not comprise a separately formed peripheral layer surrounding and intimately bonded to the peripheral surface of the closure. If such a separate peripheral layer is not comprised, the closure according to the invention is preferably formed by means of moulding or by means of monoextrusion, preferably by means of monoextrusion. This means that an extrudate having a single component, an elongated cylindrical rod, is formed. This also corresponds to a core member of the present disclosure.

It is possible that the closure comprises one or more peripheral layers peripherally surrounding and intimately bonded to the peripheral surface of the closure, also referred to as the core member. An optional peripheral layer is preferably intimately bonded to substantially the entire peripheral surface of the core member, in particular the entire peripheral surface of a substantially cylindrical core member. If any large unbonded areas exist, flow paths for gas and liquid could result. Consequently, secure, intimate, bonded interengagement of at least one peripheral layer with the core member is advantageous for attaining a bottle closure for the wine industry. In order to achieve integral bonded interconnection between the at least one peripheral layer and the core member, the at least one peripheral layer is formed about the core member in a manner which assures intimate bonded engagement.

The closure according to the present disclosure is preferably formed by extrusion. If the closure comprises one or more peripheral layers, these are preferably formed as a separate layer or as separate layers, by means of co-extrusion. Particularly, the desired secure, intimate, bonded, interengagement is attained by simultaneous co-extrusion of the at least one peripheral layer and the core member or by applying the at least one peripheral layer to the continuous, elongated length of material after the continuous, elongated length of material has been formed. By employing either process, intimate bonded interengagement of the at least one peripheral layer to the continuous, elongated length of material is attained.

In a particular aspect of the present disclosure, therefore, the closure can be produced by a process comprising at least a process step of co-extrusion. According to this aspect of the disclosure, the synthetic closure comprises a core member and a peripheral layer, which are formed by co-extrusion. Suitable co-extrusion methods are known to the skilled person.

In one aspect of the present disclosure, comprising a core member and a peripheral layer, said core member and said at least one peripheral layer are extruded substantially simultaneously. In another aspect, the core member is extruded separately and subsequent thereto said at least one peripheral layer is formed in extrusion equipment peripherally surrounding and enveloping the pre-formed core member.

In further aspects of the disclosed closure, comprising two or more peripheral layers, it is possible that a first peripheral layer which is in secure, intimate, bonded, interengagement with the outer surface of a core member, particularly with the outer cylindrical surface of a cylindrical core member is formed by either substantially simultaneous extrusion with the core member, or by subsequent extrusion, or by moulding, as described herein. A second layer and subsequent peripheral layers can then be formed likewise by either substantially simultaneous extrusion with the core member and the first or further peripheral layers, or by subsequent extrusion, as described herein for the first peripheral layer. With multiple peripheral layers it is also possible that two or more peripheral layers are extruded subsequently, as described herein, but substantially simultaneously with each other.

In a preferred embodiment of the inventive closure, the closure does not comprise a peripheral layer. This is preferred, for example with closures for sparkling wine bottles, but can also be preferred with cylindrical closures, for example for still wine bottles. It is an advantage of the present disclosure that even in the absence of a peripheral layer, a closure according to the invention has a sufficiently smooth surface for use as a closure even if cork particles are comprised to greater than 50 wt. %, for example 51 wt. % or more of the total closure weight.

The closure comprises a plastic material comprising at least one thermoplastic polymer. The plastic material can comprise one thermoplastic polymer, or more than one thermoplastic polymer, for example two, three or more thermoplastic polymers. If expandable microspheres are used as foaming agent, the plastic material typically comprises more than one thermoplastic polymer. This is because the thermoplastic polymer or polymers of the microsphere shells remains in the closure. The term "polymer" is intended to include all materials having a polymeric chain composed of many subunits, which may be the same or different, such as, for example, all types of homopolymers and copolymers, including statistical copolymers, random copolymers, graft copolymers, periodic copolymers, block copolymers, any of which may be straight chain or branched. The term "thermoplastic" has its usual meaning in the art.

According to a preferred aspect of the closure according to the invention, the plastic material is thermoplastically processable. This means that the plastic material of the closure, once formed into the closure, can be re-formed or re-processed thermally, i.e. by applying heat. This is preferably achieved if the plastic material comprises thermoplastic polymer without added crosslinker. It is, however, possible to add small amounts of crosslinker or of some types of glue, such as epoxy glue, for example in order to modify rheology or make polymers compatible, and still retain thermoplastic processability. Thermoplastic processability can be advantageous if it is desired to separate the cork particles, for example in order to recycle or reuse any part of the closure, such as the cork particles or the plastic material or both. The thermoplastic processability of the plastic material distinguishes the closures of the present invention from known closures comprising cork particles, which are generally formed by reactive moulding involving in situ polymerization to form non-thermoplastic polymers such as polyurethanes or polyacrylates, or include thermosetting polymers, or crosslinkers that reduce or prevent thermal processability, or crosslinkers in an amount that reduce or prevent thermal processability. These known non-thermoplastic closures cannot be processed thermally, making it difficult, if not impossible, to separate different components such as cork and polymer and thus separately to recycle or reuse any part of the closure. The formulation of the closures of the present invention, which allows the formation of the closures by thermoplastic extrusion or moulding methods, contributes to making this possible.

According to a particular aspect of the present disclosure, at least one, preferably each thermoplastic polymer comprised in the plastic material is a low-density polymer having an unfoamed density in the range of from $0.7 \text{ g/cm}^3$ to $1.4 \text{ g/cm}^3$. This aspect can be particularly advantageous if the core member comprises larger amounts of the plurality of particles, in particular cork particles, within the ranges disclosed herein, for example more than 40 wt. %, more than 45 wt. %, more than 50 wt. % and particularly more than 51 wt. % particles, in particular cork particles. A lower polymer density helps to compensate a possible increase in density of the closure resulting from inclusion of the plurality of particles.

In an exemplary aspect according to the present disclosure the closure of the present disclosure comprises, as its principal component, a core member formed from extruded, foamed plastic material comprising one or more thermoplastic polymers, selected from copolymers, homopolymers, or combinations of any two or more thereof. Although any known thermoplastic polymeric material, particularly any foamable thermoplastic polymeric material can be employed in the closure of the present disclosure, the plastic material is preferably selected for producing physical properties similar to natural cork, so as to be capable of providing a synthetic closure for replacing natural cork as a closure for wine bottles. By way of example, the plastic material for the core member can be a closed cell foam plastic material.

If the closure comprises one or more peripheral layers, the material of one or more peripheral layers comprises one or more thermoplastic polymers. In an exemplary aspect, the at least one peripheral layer, if comprised, comprises a thermoplastic polymer identical or similar to the thermoplastic polymer comprised in the core member. A peripheral layer can, on the other hand, comprise a thermoplastic polymer which is different to the thermoplastic polymer or thermoplastic polymers comprised in the core member. However, as detailed herein, in either case, irrespective of the polymer or polymers, the physical characteristics imparted to a peripheral layer preferably differ substantially from the physical characteristics of the core member, in particular the peripheral layer density is substantially greater than the core member density. A preferred peripheral layer density is in the range of from $50 \text{ kg/m}^3$ to $1500 \text{ kg/m}^3$, preferably in the range of from $100 \text{ kg/m}^3$ to $1500 \text{ kg/m}^3$, preferably in the range of from $200 \text{ kg/m}^3$ to $1500 \text{ kg/m}^3$, preferably in the range of from $300 \text{ kg/m}^3$ to $1500 \text{ kg/m}^3$, preferably in the range of from $400 \text{ kg/m}^3$ to $1500 \text{ kg/m}^3$, preferably in the range of from $500 \text{ kg/m}^3$ to $1500 \text{ kg/m}^3$, preferably in the range of from $600 \text{ kg/m}^3$ to $1500 \text{ kg/m}^3$, preferably in the range of from $700 \text{ kg/m}^3$ to $1500 \text{ kg/m}^3$, preferably in the range of from $750 \text{ kg/m}^3$ to $1500 \text{ kg/m}^3$, or in the range of from $700 \text{ kg/m}^3$ to $1350 \text{ kg/m}^3$, or in the range of from $700 \text{ kg/m}^3$ to $1100 \text{ kg/m}^3$, or in the range of from $750 \text{ kg/m}^3$ to $1350 \text{ kg/m}^3$, or in the range of from $750 \text{ kg/m}^3$ to $1100 \text{ kg/m}^3$.

According to a preferred aspect of the closure according to the invention the plastic material comprises one or more polymers that are biodegradable according to ASTM D6400. As the cork particles are biodegradable, if the plastic material comprises one or more biodegradable polymers, the majority or the entirety of the closure can be made to be biodegradable. If it is desired for a multi-component closure to be biodegradable, compostable or recyclable, preferably both the plastic material of the core member and the plastic material of the peripheral layer or layers are biodegradable, compostable or recyclable.

Preferably, from 50% by weight to 100% by weight of the closure, preferably from 60% by weight to 100% by weight of the closure, preferably from 70% by weight to 100% by weight of the closure, preferably from 80% by weight to 100% by weight of the closure, preferably from 85% by weight to 100% by weight of the closure, preferably from 85% by weight to 99.9% by weight of the closure, preferably from 90% by weight to 99.9% by weight of the closure, preferably from 90% by weight to 99% by weight of the closure, preferably from 90% by weight to 98% by weight of the closure, based on the entire weight of the closure, including any peripheral layer or layers if present, is biodegradable according to ASTM D6400. If a chemical or physical blowing agent is used to form the foam plastic material, it can be possible to achieve up to and including about 100% biodegradability of the closure, for example from 90% by weight to 100% by weight of the closure, preferably from 95% by weight to 100% by weight of the closure, preferably from 98% by weight to 100% by weight of the closure, based on the entire weight of the closure, by selecting one or more biodegradable thermoplastic polymers as plastic material. The currently available polymer formulations for the shells of commercial expandable microspheres are not biodegradable. If a closure according to the invention is made using currently available expandable microspheres as foaming agent, the closure will include approximately the same weight per cent amount of non-biodegradable polymer as the weight per cent amount of the expandable microspheres in the closure, and the biodegradable portion of the closure will be correspondingly decreased by the same amount. Accordingly, if expandable microspheres are employed as foaming agent, the plastic material can comprise up to 10 wt. %, preferably from about 0.005 wt. % to about 10 wt. %, preferably in an amount ranging from about 0.05 wt. % to about 10 wt. %, preferably in an amount ranging from about 0.5 wt. % to about 10 wt. %, preferably in an amount ranging from about 1.0 wt. % to about 10 wt. %, preferably in an amount ranging from about 1.0 wt. % to about 8 wt. %, preferably in an amount ranging from about 1.0 wt. % to about 5 wt. %, preferably in an amount ranging from about 1.0 wt. % to about 4 wt. %, or in an amount ranging from about 1.5 wt. % to about 4.0 wt. %, based on the total weight of the plastic material, of non-biodegradable thermoplastic polymer. Should suitable biodegradable expandable microspheres become available, the amount of biodegradable material in the closure can be increased accordingly.

The plastic material of the closure according to the invention preferably comprises one or more thermoplastic polymers selected from the group consisting of: polyethylenes; metallocene catalyst polyethylenes; polybutanes; polybutylenes; thermoplastic polyurethanes; silicones; vinyl-based resins; thermoplastic elastomers; polyesters; ethylenic acrylic copolymers; ethylene-vinyl-acetate copolymers; ethylene-methyl-acrylate copolymers; thermoplastic polyolefins; thermoplastic vulcanizates; flexible polyolefins; fluorelastomers; fluoropolymers; polytetrafluoroethylenes; ethylene-butyl-acrylate copolymers; ethylene-propylene-rubber; styrene butadiene rubber; styrene butadiene block copolymers; ethylene-ethyl-acrylic copolymers; ionomers; polypropylenes; copolymers of polypropylene and ethylenically unsaturated comonomers copolymerizable therewith; olefin copolymers; olefin block copolymers; cyclic olefin copolymers; styrene ethylene butadiene styrene block copolymers; styrene ethylene butylene styrene block copolymers; styrene ethylene butylene block copolymers; styrene butadiene styrene block copolymers; styrene butadiene block copolymers; styrene isoprene styrene block copolymers; styrene isobutylene block copolymers; styrene isoprene block copolymers; styrene ethylene propylene styrene block copolymers; styrene ethylene propylene block copolymers; polyvinylalcohol; polyvinylbutyral; polyhydroxyalkanoates; copolymers of hydroxyalkanoates and monomers of biodegradable polymers; polylactic acid; copolymers of lactic acid and monomers of biodegradable polymers; aliphatic copolyesters; aromatic-aliphatic copolyesters; polycaprolactone; polyglycolide; poly(3-hydroxybutyrate); poly(3-hydroxybutyrate-co-3-hydroxyvalerate); poly(3-hydroxybutyrate-co-3-hydroxyhexanoate); poly(butylenesuccinate); poly(butylenesuccinate-co-adipate); poly(trimethyleneterephthalate); poly(butylenadipate-co-terephthalate); poly(butylenesuccinate-co-terephthalate); poly(butylenesebacate-co-terephthalate); lactic acid caprolactone lactic acid copolymers; lactic acid ethylene oxide lactic acid copolymers; polymers formed from monomer units selected from vinylidene chloride, acrylonitrile, methacrylonitrile, and methyl methacrylate; copolymers formed from two or more monomer units selected from vinylidene chloride, acrylonitrile and methyl methacrylate; and combinations of any two or more thereof.

Thermoplastic polymers for the plastic material may be selected from the group consisting of polyolefins, in particular polyethylenes and/or polypropylenes. If a polyethylene is employed, in an exemplary aspect of the closure disclosed herein the polyethylene can comprise one or more polyethylenes selected from the group consisting of high density, medium density, low density, linear low density, ultra high density, and medium low density polyethylenes. Suitable plastic materials for the closure, or the core element thereof, can be polyethylene, in particular LDPE, and/or ethylene-vinyl-acetate copolymer (EVA). These materials can be used alone or in combination with one or more other thermoplastic polymers disclosed herein, in particular with metallocene PE or metallocene PP, particularly with metallocene PE.

The closure can comprise a cyclic olefin copolymer. Suitable cyclic olefin copolymers, as well as methods for their synthesis and characterization, are described in U.S. Pat. No. 8,063,163 B2, the contents of which in relation thereto are incorporated by reference herein and form a part of the present disclosure. A suitable cyclic olefin copolymer is commercially available under the name Topas® Elastomer E-140 from Topas Advanced Polymers, Germany. A preferred cyclic olefin copolymer is a copolymer of ethylene and norbornene.

Particularly preferred plastic materials are thermoplastic elastomers based on one or more polyesters. Thermoplastic elastomers have both thermoplastic and elastomeric properties and are sometimes also referred to as thermoplastic rubbers. The elastomeric properties can be useful in closures as they can contribute, for example to elasticity, compression recovery, and compressibility, among others. Elastomers are generally thermosetting and thus not thermoplastically processable. For this reason elastomers generally cannot be recycled. They also cannot be processed thermoplastically, for example by means of extrusion. Thermoplastic elastomers are thermoplastically processible and can be recycled. Thermoplastic elastomers based on polyesters can additionally be biodegradable to a significant degree due to the ester linkages, which are more easily cleaved than other polymer linkage types. Thermoplastic elastomers based on one or more polyamides can also be considered. However, thermoplastic elastomers based on one or more polyesters are preferred. The entire plastic material can be formed from one or more thermoplastic elastomers, or the plastic material can comprise one or more thermoplastic elastomers, in particular one or more thermoplastic elastomers based on one or more polyesters, in an amount of up to 80 wt. %, particularly in an amount in a range of from 2 wt. % to 80 wt. %, particularly in an amount in a range of from 5wt. % to 80 wt. %, particularly in an amount in a range of from 10 wt. % to 80 wt. %, particularly in an amount in a range of from 15 wt. % to 80 wt. %, particularly in an amount in a range of from 20 wt. % to 80 wt. %, particularly in an amount in a range of from 25 wt. % to 80 wt. %.

It is advantageous for the closure to be at least partially biodegradable, compostable, recyclable, or to be made using at least a proportion of renewable and/or sustainable materials. If it is desired that the closure should be biodegradable, or biodegradable to greater than 85 wt. %, preferably to greater than 90 wt. %, the plastic material preferably comprises one or more biodegradable thermoplastic polymers. In particular, the plastic material preferably comprises one or more biodegradable thermoplastic polymers selected from the group consisting of polyhydroxyalkanoates; copolymers of hydroxyalkanoates and monomers of biodegradable polymers; polylactic acid; copolymers of lactic acid and monomers of biodegradable polymers; aliphatic copolyesters; aliphatic-aromatic copolyesters; polycaprolactone; polyglycolide; poly(3-hydroxybutyrate); poly(3-hydroxybutyrate-co-3-hydroxyvalerate); poly(3-hydroxybutyrate-co-3-hydroxyhexanoate); poly(butylenesuccinate); poly(butylenesuccinate-co-adipate); poly(trimethyleneterephthalate); poly(butylenadipate-co-terephthalate); poly(butylenesuccinate-co-terephthalate); poly(butylenesebacate-co-terephthalate); lactic acid caprolactone lactic acid copolymers; lactic acid ethylene oxide lactic acid copolymers; and combinations of any two or more thereof. If a polyhydroxyalkanoate (PHA) is comprised, the polyhydroxyalkanoate monomers preferably contain at least four carbon atoms, preferably four or five carbon atoms. Advantageously, the repeat unit of the polyhydroxyalkanoate according to the present disclosure comprises [—O—CHR—CH$_2$—CO—], wherein R is a linear or branched alkyl group with the formula $C_nH_{2n+1}$ with n being an integer from 1 to 15, particularly from 1 to 6. If a PHA is employed, in an exemplary aspect of the present disclosure, the PHA preferably comprises one or more PHAs selected from the group consisting of poly(3-hydroxybutyrate), poly(3-hydroxybutyrate-co-3-hydroxyvalerate), and poly(3-hydroxybutyrate-co-3-hydroxyhexanoate). Advantageously, these polymers have a molecular weight of from 100,000 g/mol to 1,000,000 g/mol and/or a melting point of from 100° C. to 200° C. Mixtures of one or more PHAs with poly(lactic acid) are also particularly useful. If a polyester is employed, in an exemplary aspect of the present disclosure, the polyester preferably comprises one or more polyesters selected from the group consisting of polycaprolactone, polyglycolide, poly(butylensuccinate), poly(lactic acid), polybutylenesuccinateadipate, polytrimethyleneterephthalate, polybutylenadipatetereohthalate, polybutylensuccinate-terephthalate, polybutylensebacateterephthalate. If a block copolymer of lactic acid is employed, in an exemplary aspect of the present disclosure, the block copolymer of lactic acid comprises lactic acid-caprolactone-lactic acid copolymers, lactic acid-ethylene oxide-lactic acid copolymers.

If expandable microspheres are used as foaming agent, the plastic material further comprises one or more thermoplastic polymers selected from the group consisting of polymers formed from monomer units selected from vinylidene chloride, acrylonitrile and methyl methacrylate; copolymers formed from two or more monomer units selected from vinylidene chloride, acrylonitrile and methyl methacrylate; and combinations of any two or more thereof.

A particularly preferred biodegradable thermoplastic polymer is one or more aliphatic-aromatic copolyesters. According to a preferred aspect of the inventive closure, the closure comprises an aliphatic-aromatic copolyester. The aliphatic-aromatic copolyester is preferably selected from aliphatic-aromatic copolyesters having a glass transition temperature measured by Dynamic Scanning calorimetry (DSC) according to ASTM D3418-15 of less than 0° C., preferably less than –4° C., more preferably less than –10° C., more preferably less than –20° C., more preferably less than –30° C. The aliphatic-aromatic copolyester is preferably a statistical copolyester on the basis of at least adipic acid and/or sebacic acid. In a statistical copolyester, the constituting monomer units are irregularly distributed along the polymer chain. Statistical copolyesters are sometimes also referred to as random copolyesters. In general, aliphatic-aromatic copolyesters comprising terephthalate units derived from terephthalic acid or a substituted terephthalic acid as aromatic unit are preferred. Aliphatic-aromatic copolyesters comprising terephthalate units derived from terephthalic acid or a substituted terephthalic acid as aromatic unit and aliphatic units derived from difunctional aliphatic organic acids and/or difunctional aliphatic alcohols, such as aliphatic diacids, aliphatic diols, or aliphatic units comprising at least one alcohol functionality and at least one acid functionality, have been found capable of fulfilling the requirements imposed upon plastic materials for closures as described herein, in particular closures for wine bottles. Preferably, the aliphatic-aromatic copolyester according to the disclosure is a copolyester or a statistical copolyester on the basis of 1,4-butanediol, adipic acid or sebacic acid, and terephthalic acid or an ester-forming derivative of terephthalic acid. Preferably, the aliphatic-aromatic copolyester according to the disclosure exhibits a glass transition temperature measured according to ASTM D 3418-15 of from –25° C. to –40° C., more preferably from –30° C. to –35° C., and/or an area of melting temperatures of from 100° C. to 120° C., more preferably from 105° C. to 115° C. This ensures suitable handling and use properties in a typical temperature range.

Particularly preferred biodegradable thermoplastic polymers are one or more selected from the group consisting of polybutyleneadipateterephthalates; polybutylenesuccinateterephthalates; polybutylenesebacateterephthalates; and combinations of two or more thereof. A suitable commercially available biodegradable thermoplastic aliphatic-aromatic copolyester is Ecoflex® C1200 from BASF SE, Ludwigshafen, Germany or from BASF Corporation of Wyandotte, Mich. (US). Ecoflex® C1200 is a polybutylene adipate terephthalate (PBAT) copolymer that is a statistical, aliphatic-aromatic copolyester based on the monomers 1,4-butanediol, adipic acid and terephthalic acid in the polymer chain.

If the closure comprises one or more peripheral layers, the peripheral layer or layers can comprise a thermoplastic polymer identical or similar to the thermoplastic polymer comprised in the core member. A peripheral layer can, on the other hand, comprise a thermoplastic polymer which is different from the thermoplastic polymer or thermoplastic polymers comprised in the core member.

According to an exemplary aspect of the closure of the present disclosure comprising a core member and at least one peripheral layer, the peripheral layer comprises at least one thermoplastic polymer selected from the group consisting of polyethylenes, metallocene catalyst polyethylenes, polypropylenes, metallocene catalyst polypropylenes, polybutenes, polybutylenes, other polyolefins, fluorinated polyolefins, particularly partially fluorinated or perfluorinated polyethylenes, polyurethanes, EPDM rubber, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, polyether-type polyurethanes, thermoplastic olefins, thermoplastic vulcanizates, flexible polyolefins, fluorelastomers, fluoropolymers, polyethylenes, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers, cyclic olefin copolymers, styrene ethylene butadiene styrene block copolymers, styrene ethylene butylene styrene block copolymers, styrene ethylene butylene block copolymers, styrene butadiene styrene block copolymers, styrene butadiene block copolymers, styrene isoprene styrene block copolymers, styrene isobutylene block copolymers, styrene isoprene block copolymers, styrene ethylene propylene styrene block copolymers, styrene ethylene propylene block copolymers, polyvinylalcohol, polyvinylbutyral, polyhydroxyalkanoates, copolymers of hydroxyalkanoates and monomers of biodegradable polymers, aliphatic copolyesters, aromatic-aliphatic copolyesters, poly(lactic acid), copolymers of lactic acid and monomers of biodegradable polymers, polycaprolactone, polyglycolide, poly(3-hydroxybutyrate), poly(3-hydroxybutyrate-co-3-hydroxyvalerate), poly(3-hydroxybutyrate-co-3-hydroxyhexanoate), poly(butylensuccinate), poly(butylensuccinate-co-adipate), poly(trimethyleneterephthalate), poly(butylenadipate-co-terephthalate), poly(butylensuccinate-co-terephthalate), poly(butylensebacate-co-terephthalate), lactic acid caprolactone lactic acid copolymers, lactic acid ethylene oxide lactic acid copolymers, and combinations of two or more thereof. According to an exemplary aspect of the present disclosure said at least one peripheral layer is further defined as comprising one selected from the group consisting of foamed plastics and non-foamed plastics, advantageously having a substantially greater density than the core member, in order to impart desired physical characteristics to the bottle closure of the present disclosure. In particular, the composition employed for the at least one peripheral layer is particularly selected to withstand the compression forces imposed thereon by the jaws of the corking machine. However, many different polymers, as detailed herein, are able to withstand these forces and, as a result, can be employed for the at least one peripheral layer.

Particular examples of the plastic material for the at least one peripheral layer are polyethylene, a thermoplastic vulcanizate, styrene ethylene butylene styrene block copolymers, poly(butyleneadipateterephthalate) (PBAT), lactic acid-caprolactone-lactic acid copolymers, and combinations thereof. If desired, said at least one peripheral layer can be formed from a transparent material. Furthermore, the material selected for said at least one peripheral layer may be different from that of the core member.

In order to form bottle closures comprising a core member and at least one peripheral layer with some or all of the desirable inherent physical and chemical properties detailed above, it can be advantageous to comprise metallocene catalyst polyethylene in at least one peripheral layer. As detailed herein, at least one peripheral layer may comprise, for example, substantially metallocene catalyst polyethylene as single component, or the metallocene catalyst polyethylene may be combined with one or more thermoplastic elastomers, for example with one or more thermoplastic elastomers as detailed above. If the closure comprises a peripheral layer, at least one peripheral layer may comprise, for example, one or more polyethylenes selected from the group consisting of medium density polyethylenes, medium low density polyethylenes, and low density polyethylenes in an amount in the range of from about 5% to about 100% by weight, particularly in the range of from about 5% to about 80% by weight, particularly in the range of from about 10% to about 60% by weight, particularly in the range of from about 15% to about 40% by weight, based upon the weight of the entire composition.

While peripheral layers comprising polyethylenes provide preferred closure performance properties, in order to form bottle closures comprising a core member and at least one peripheral layer with some or all of the desirable inherent physical and chemical properties according to the present invention, in particular increased environmental friendliness, in particular increased closure biodegradability, it is preferred that at least one peripheral layer, if one or more peripheral layers are present, comprises poly(butyleneadipateterephthalate) (PBAT). As detailed herein, at least one peripheral layer, if present, may comprise PBAT as substantially the sole polymer component or, if desired, PBAT may be combined with one or more thermoplastic elastomers, particularly with one or more thermoplastic elastomers as detailed above, particularly with one or more biodegradable thermoplastic elastomers as detailed above. In this regard, it has been found advantageous that at least one peripheral layer particularly comprises one or more polyesters selected from the group of biodegradable polyesters in an amount in the range of from about 5% to about 100% by weight, particularly in the range of from about 15% to about 95% by weight, particularly in the range of from about 25% to about 90% by weight, based upon the weight of the entire composition.

In an exemplary construction of this embodiment, the preferred PBAT employed for forming the at least one peripheral layer is or comprises Ecoflex®, which is sold by BASF Corporation of Wyandotte, Mich. (US). This compound has been found to produce an outer layer in combination with the core member which achieves at least one, particularly more than one, particularly almost all or even all of the physical and chemical characteristics suitable for attaining a highly effective closure for the wine industry.

A formulation which has been found to be highly effective in providing a peripheral layer comprises at least one lactic acid and/or at least one styrene block copolymer. Suitable styrene block copolymers which come into consideration can be selected from the group consisting of styrene ethylene butadiene styrene block copolymers, styrene ethylene butylene styrene block copolymers, styrene ethylene butylene block copolymers, styrene butadiene styrene block copolymers, styrene butadiene block copolymers, styrene isobutylene block copolymers, styrene isoprene styrene block copolymers, styrene isoprene block copolymers, styrene ethylene propylene styrene block copolymers, styrene ethylene propylene block copolymers and combinations of two or more thereof. In particular aspects of the present disclosure, the at least one styrene block copolymer is selected from the group consisting of styrene ethylene butadiene styrene block copolymers, styrene ethylene butylene styrene block copolymers, styrene ethylene propylene styrene block copolymers, styrene ethylene propylene block copolymers and combinations of two or more thereof. Examples of commercially available styrene block copolymers according to the present disclosure are SBS, SIS, SEBS, SIBS, SEPS, SEEPS, MBS, which are available, for example under the trade names Styroflex® and Styrolux® (BASF Corporation of Wyandotte, Mich., USA), Septon® Q, Septon® V, and Hybar (Kuraray America, Inc., Houston, Tex., USA), Maxelast® TPE (Nantong Polymax Elastomer Technology Co., Ltd), GLOBALPRENE® Polymers (LCY Chemical Corporation), Elexar® and Monprene® (Teknor Apex Company), Elastocon® series (Elastocon TPE Technologies, Inc.), TPR (Washington Penn), Evoprene™ (Alpha Gary), Versaflex®, OnFlex®, Versalloy®, Versollan®, Dynaflex® (GLS Thermoplastic Elastomers), Sevrene™ (Vichem Corporation), Vector™ (Dexco Polymers LP), Calprene® and Solprene® (Dynasol), Multiflex® TEA and Multiflex® TPE (Multibase, Inc.), Europrene® Sol T (Polimeri Europe), Sunprene™ (PolyOne), Leostomer® (Riken Technos Corporation), RTP 2700 and 6000 series (RTP), Invision® (A. Schulman), Dryflex® (VTC Elastotechnik), Quintac® (Zeon), Megol® and Raplan® (API spa), Asaprene™ and Tufprene™ (Asahi Kasei), Lifoflex (Muller Kunststoffe, Germany), Thermolast® (Kraiburg TPE GmbH & Co. KG, Waldkraiberg, Germany) or Kraton®, for example Kraton® D, Kraton® G or Kraton® FG (Kraton Polymers, Houston, Tex., USA). Suitable lactic acid copolymers which come into consideration can be selected from the group consisting of lactic acid caprolactone lactic acid block copolymers, lactic acid ethylene oxide lactic acid block copolymers, and mixtures thereof. Further sources for biodegradable polymers can be found in "Bio-Based Plastics: Materials and Applications", Stephan Kabasci, editor, John Wiley & Sons, 2014, ISBN 978-1119994008.

Another formulation which has been found to be highly effective in providing a peripheral layer comprises at least one thermoplastic vulcanizate.

Another formulation which has been found to be highly effective in providing a peripheral layer which provides at least one, particularly more than one, particularly almost all or even all physical and chemical attributes to attain a commercially viable closure comprises at least one of at least one polyether-type thermoplastic polyurethane and at least one olefin block copolymer or a blend of at least two thereof.

Each of the materials disclosed as suitable for a peripheral layer can be used alone or in combination with one or more of these materials. By employing this material or these materials and forming the material or the materials in peripheral, surrounding, bonded engagement with any desired foamed core member, a highly effective, multi-layer closure can be attained which is able to provide at least one, particularly more than one, particularly almost all or even all properties suitable for a wine bottle closure.

In an exemplary construction of this embodiment, the particular polyether-type thermoplastic polyurethane employed for forming the at least one peripheral layer comprises Elastollan® LP9162, manufactured by BASF Corporation of Wyandotte, Mich. (US). This compound has been found to produce an outer layer in combination with the core member which provides at least one, particularly more than one, particularly almost all or even all of the physical and chemical characteristics suitable for attaining a highly effective closure for the wine industry.

In another exemplary aspect of the disclosed closure comprising a core member and at least one peripheral layer, the peripheral layer comprises thermoplastic vulcanizates (TPV). Such thermoplastic vulcanizates are well known in the art and are commercially available, for example, under the trade name Santoprene® from ExxonMobil Chemical Company of Houston, Texas (US), Sarlink® from Teknor Apex B.V., Geleen (NL) or OnFlex® from PolyOne Inc. of Avon Lake, Ohio (US).

In addition to employing the polyether-type thermoplastic polyurethane detailed above, another composition that has been found to be highly effective in providing at least one, particularly more than one, particularly almost all or even all of the desirable attributes for at least one peripheral layer is a blend of at least one polyolefin, particularly at least one thermoplastic polyolefin and at least one thermoplastic vulcanizate. The construction of a closure using a peripheral layer formed from this blend provides a closure which is highly suitable for use as a wine bottle closure.

A further composition that can provide at least one, particularly more than one, particularly almost all or even all of the desirable attributes for at least one peripheral layer is a blend of at least one polyolefin, particularly at least one thermoplastic polyolefin, and at least one styrene block copolymer, or a blend of at least one thermoplastic vulcanizate and at least one styrene block copolymer. The construction of a closure using a peripheral layer formed from this blend provides a closure which is highly suitable for use as a wine bottle closure.

In a further alternate embodiment, a closure can be attained by employing at least one of at least one metallocene catalyst polyethylene and at least one olefin block copolymer, either independently or in combination with at least one selected from the group consisting of low density polyethylenes, medium density polyethylenes, and medium low density polyethylenes.

A further composition that has been found to be highly effective in providing at least one, particularly more than one, particularly almost all or even all of the desirable attributes for at least one peripheral layer, and is preferred according to the present invention, is a blend of at least one polyester, particularly at least one statistical aromatic-aliphatic copolyester, and at least one lactic acid block copolymer. A suitable blend of at least one polyester, preferably at least one statistical aromatic-aliphatic copolyester, preferably PBAT, and at least one lactic acid polymer or lactic acid derivative, in particular at least one lactic acid block copolymer, comprises the polyester, preferably the statistical aromatic-aliphatic copolyester in an amount in the range of from about 5% to about 95% by weight, or in an amount in the range of from about 20% to about 80% by weight, or in an amount in the range of from about 30% to about 70% by weight, or in an amount in the range of from about 40% to about 60% by weight, based upon the weight of the entire composition of and the lactic acid polymer or lactic acid derivative, preferably the lactic acid block copolymer, in an amount in the range of from about 95% to about 5% by weight, particularly in an amount in the range of from about 80% to about 20% by weight, particularly in an amount in the range of from about 70% to about 30% by weight, particularly in an amount in the range of from about 60% to about 40% by weight, based upon the weight of the entire composition. Exemplary weight ratios of lactic acid block copolymer to statistical aliphatic-aromatic copolyester are about 95:5, about 90:10, about 85:15, about 80:20, about 75:25, about 70:30, about 65:35, about 60:40, about 55:45, about 50:50, based on the total weight of lactic acid block copolymer and statistical aliphatic-aromatic copolyester. The construction of a closure using a peripheral layer formed from this blend provides a closure which is highly suitable for use as a wine bottle closure, particularly a biodegradable wine bottle closure.

Still further additional compounds which have been found to provide highly effective peripheral layers for forming closures, in accordance with the present disclosure, comprise Teflon®, fluoroelastomeric compounds and fluoropolymers. These compounds, whether employed individually or in combination with each other or with the other compounds detailed above have been found to be highly effective in producing a peripheral layer which is capable of providing at least one, particularly more than one, particularly almost all or even all of the properties making it suitable for bottle closures.

Any of the compounds detailed herein for providing the at least one peripheral layer can be employed alone or in combination with each other, using suitable preparation methods detailed herein to produce a peripheral layer which is securely and integrally bonded to the core member and/or to a different peripheral layer, as a foamed outer layer or a non-foamed outer layer, or as an intermediate layer.

According to a particular aspect of the present disclosure, at least one, preferably each, thermoplastic polymer comprised in the peripheral layer is biodegradable according to ASTM D6400.

The at least one peripheral layer, if present, particularly the outer peripheral layer is particularly formed with a thickness and/or a density which are capable of imparting desired physical characteristics, such as resistance to bottling conditions, to the closure of the present disclosure. The at least one peripheral layer, particularly the outer peripheral layer is, in particular, formed with a substantially greater density than the inner core and/or with a selected thickness.

Accordingly, said at least one peripheral layer, if present, is particularly further defined as comprising a thickness ranging from about 0.05 mm to about 5 mm. Although this range has been found to be efficacious for producing a closure which is completely functional and achieves most or all of the desired goals, the exemplary aspect for wine bottles particularly comprises a thickness ranging from about 0.05 mm to about 2 mm, whereby exemplary lower limits for the thickness are about 0.05 mm, about 0.06 mm, about 0.07 mm, about 0.08 mm, about 0.09 mm, about 0.1 mm, about 0.2 mm, about 0.3 mm, about 0.4 mm or about 0.5 mm and exemplary upper limits for the thickness are about 1 mm, about 2 mm, about 3 mm, about 4 mm, or about 5 mm. The exemplary thickness of the at least one peripheral layer, if present, can be selected according to criteria such as, for example, the composition, physical properties and/or density of the material of the at least one peripheral layer, and the desired properties of the at least one peripheral layer.

As discussed herein, intimate bonded interengagement of the at least one peripheral layer, if present, to the core member is advantageous for providing a bottle closure capable of being used in the wine industry. In this regard, although it has been found that the methods detailed herein provide secure intimate bonded interengagement of the at least one peripheral layer to the core member, alternative layers or bonding chemicals can be employed, depending upon the particular materials used for forming the core member and the at least one peripheral layer.

If desired, for a disclosed closure comprising a core member and at least one peripheral layer, bonding agents or tie layers known to the skilled person can be employed on the outer surface of the core member in order to provide secure intimate bonded interengagement of the at least one peripheral layer therewith. If a tie layer is employed, the tie layer would effectively be interposed between the core member and the at least one peripheral layer to provide intimate bonded interengagement by effectively bonding the peripheral layer and the core member to the intermediately positioned tie layer. However, regardless of which process or bonding procedure is employed, all of these alternate embodiments are within the scope of the present disclosure. If more than one peripheral layer is present, such bonding agents or tie layers can similarly be employed between respective peripheral layers.

The closure according to the present invention comprises a plurality of particles comprising cork, the particles having particle size distribution measured by means of mechanical sieving, according to the ISO standard test method ICS 19.120, such that the $D_{50}$ value is in the range of from 0.20 millimeters to 10 millimeters. The plurality of particles preferably has a $D_{50}$ determined according to test method ICS 19.120, in the range of from 0.25 mm to 10 mm, preferably in the range of from 0.5 mm to 5 mm, or in the range of from 1.0 mm to 3.0 mm, particularly in the range of from greater than 1.0 mm to 2.0 mm, or in the range of from greater than 2.0 mm to 3.0 mm. The average or mean particle size measured by means of mechanical sieving, according to the ISO standard test method ICS 19.120, is preferably in the range of from 0.25 mm to 10 mm, preferably in the range of from 0.5 mm to 8 mm, preferably in the range of from 0.5 mm to 6 mm, preferably in the range of from 0.5 mm to 5.0 mm, preferably in the range of from 0.5 mm to 4.0 mm, preferably in the range of from 0.8 mm to 4.0 mm, preferably in the range of from 0.8 mm to 3.8 mm, preferably in the range of from 0.8 mm to 3.5 mm, preferably in the range of from 1.0 mm to 3.5 mm, preferably in the range of from 1.0 mm to 3.3 mm, most preferably in the range of from 1.0 mm to 3.0 mm. The plurality of particles can alternatively have an average or mean particle size or a $D_{50}$ value in the range of from greater than 2.0 mm to 10.0 mm, particularly in the range of from greater than 2.0 mm to 8.0 mm, preferably in the range of from greater than 2.0 mm to 5.0 mm, or in the range of from greater than 2.0 mm to 4.0 mm, preferably in the range of from greater than 2.0 mm to 3.5 mm, particularly in the range of from greater than 2.0 mm to 3.0 mm. Preferred ranges for the average or mean particle size or $D_{50}$ are selected from the ranges of from 0.9 mm to 1.0 mm, from 1.0 mm to 2.0 mm, from 1.5 mm to 2.5 mm, from 2.0 mm to 3.0 mm, from 2.5 mm to 3.5 mm, and from 3.0 mm to 4.0 mm. Particularly preferred ranges for the average particle size or $D_{50}$ are selected from the ranges of from 1.0 mm to 2.0 mm, and from 2.0 mm to 3.0 mm, or from greater than 1.0 mm to less than 2.0 mm, or from greater than 2.0 mm to 3.0 mm The plurality of particles is preferably a plurality of cork particles. While other types of natural and synthetic filler particles can be envisaged, cork particles possess a desirable combination of physical properties such as density, cellular structure, as well as appearance, making them particularly suitable for the closures of the present invention.

The plurality of particles, in particular a plurality of cork particles, is preferably suitable for food contact. The plurality of particles, in particular a plurality of cork particles, is preferably a plurality of "clean" particles. This means that the particles are cleaned or washed using an appropriate cleaning or washing method, before being incorporated into or used in the inventive closures. The plurality of clean particles is preferably free or substantially free from any contaminants, for example contaminants that might be present from previous uses or processing steps, as well as agents that can affect the taste, smell, and/or other properties of the product to be retained in the container. The plurality of clean particles is particularly preferably free or substantially free from organoleptic agents, in particular free from all or substantially all haloanisoles, in particular TCA, but also optionally TBA, TeCA and/or PCA. If the plurality of particles is a plurality of cork particles, the particles have preferably been washed in order to remove all or substantially all organoleptic agents, in particular all or substantially all haloanisoles, in particular TCA, but also optionally TBA, TeCA and/or PCA which may be present in cork. Such a washing step can be effected, for example, by means of any suitable solvent, including, but not limited to, organic solvents such as hydrocarbons, aqueous fluids such as washing solutions or dispersions which are capable of removing TCA from cork, or supercritical fluids such as supercritical carbon dioxide. Environmentally friendly solvents which are also food-safe are preferred, such as aqueous fluids or supercritical fluids. During a washing step the cork particles can be suspended in the solvent, optionally agitated, and then the solvent removed by filtration or the like. A washing step can be repeated as many times as necessary to achieve an acceptable level of haloanisoles, particularly of chloroanisoles, particularly of TCA, but also optionally TBA, TeCA and/or PCA, in the particles, in particular in the cork particles. The amount of haloanisole released from a cork into wine can be measured as so-called "releasable haloanisole" by soaking a cork or a sample of corks in a wine for 24 hours for an untreated cork or 48 hours for a treated cork, and measuring the amount of each haloanisole compound in the wine, for example by means of chromatographic or spectroscopic methods such as gas chromatography or nuclear magnetic resonance spectroscopy. An acceptable level is generally considered to be one which results in an amount of the respective chloroanisole or chloroanisoles in the wine which is below the average sensory threshold of about 6 ng/L for TCA or TBA, whereby TeCA and PCA have been reported to be respectively about three times and one thousand times less potent in their sensory thresholds. A closure disclosed herein preferably has a content of releasable trichloroanisole of less than 6 ng/L, preferably less than 5 ng/L, preferably less than 4 ng/L, preferably less than 3 ng/L, preferably less than 2 ng/L.

The plurality of particles, in particular a plurality of cork particles, preferably has a humidity in the range of from about 0% to about 10%, particularly in the range of from about 0% to about 8%, particularly in the range of from about 0% to about 8%, particularly in the range of from about 0% to about 7%, particularly in the range of from about 0% to about 6%, more particularly in the range of from about 0% to about 5%, more particularly in the range of from about 0% to about 5%, more particularly in the range of from about 0% to about 4%, more particularly in the range of from about 0% to about 3%, more particularly in the range of from about 0% to about 2%, more particularly in the range of from about 0% to about 1%.

One advantage of the closure according to the present disclosure is that it is possible to achieve a homogeneous distribution of the plurality of particles throughout the closure. In particular, the plurality of particles is preferably homogeneously distributed within the polymer matrix, preferably substantially each individual particle is surrounded by and embedded within the polymer matrix Accordingly, in the inventive closure the plurality of particles is preferably distributed homogeneously throughout the closure. This is possible because the formulation enables a processability that allows the formation of a polymer matrix by means of extrusion, the polymer matrix having physical properties, such as cellular structure and cell density, that support a homogeneous distribution of the plurality of particles throughout the polymer matrix. The homogeneous distribution of the plurality of particles is advantageous because it allows individual particles to be coated by and/or embedded within the polymer matrix, which avoids the formation of localized clusters of particles without sufficient polymer, which in turn can cause weak spots and crumbling of the closure.

According to one aspect of the closure according to the present disclosure, the closure comprises a core member and does not comprise a peripheral layer. In this aspect, the core member forms the entire closure, and the plurality of particles is comprised in the core member. This aspect can be advantageous particularly in reducing cost per closure, and simplifying the production.

If a peripheral layer is comprised, the plurality of particles is comprised in at least one of the core member and the peripheral layer, preferably in either the core member or the peripheral layer, or in the core member and the peripheral layer.

In a particular aspect of the present disclosure the plurality of particles is comprised in the core member and in the peripheral layer, if a peripheral layer is present.

In a further aspect of the present disclosure the plurality of particles is comprised in the core member, and is substantially absent from the peripheral layer, if a peripheral layer is present.

In a particular aspect of the present disclosure the closure comprises a peripheral layer and the plurality of particles is comprised in the peripheral layer. According to this aspect the plurality of particles can be substantially absent from the core member.

In a particularly preferred embodiment, the closure does not comprise a peripheral layer, or does not comprise a separately extruded peripheral layer.

The plurality of particles, in particular a plurality of cork particles, can be comprised in an amount in the range of from 40 wt. % to 85 wt. %, more particularly in an amount in the range of from 45 wt. % to 85 wt. %, more particularly in an amount in the range of from 50 wt. % to 85wt. %, more particularly in an amount in the range of from greater than 50 wt. % to 85 wt. %, more particularly in an amount in the range of from greater than 50 wt. % to 80 wt. %, more particularly in an amount in the range of from greater than 50 wt. % to 75 wt. %, more particularly in an amount in the range of from greater than 50 wt. % to 70 wt. %, more particularly in an amount in the range of from 51 wt. % to 70 wt. %, more particularly in an amount in the range of from 51 wt. % to 65 wt. %, more particularly in an amount in the range of from 51 wt. % to 60 wt. %, more particularly in an amount in the range of from 51 wt. % to 55 wt. %, in each case based on the total weight of the closure.

According to an aspect of the closure comprising a peripheral layer, the plurality of particles may be comprised in the peripheral layer. However, the plurality of particles is preferably comprised in the core member, or in both the core member and the peripheral layer.

The inclusion of the plurality of particles can detrimentally affect the processability of the composition used for preparing a closure of the present invention, as well as potentially negatively affecting closure performance and properties. In order to reduce or eliminate any reduction in processability or performance, particularly due to the plurality of particles, the closure of the present invention comprises one or more processing aids. The one or more processing aids are comprised in at least the closure component that comprises the plurality of particles. The preferred processing aid or processing aids are preferably selected from processing aids that are capable of modifying the processability of the formulation during formation of the closure, such as the melt processability of the formulation during formation of the closure by means of extrusion or moulding, particularly by means of extrusion. Process and processability modifications can be, for example, reduction in operating pressure and/or temperature, reduced friction between the composition and the forming equipment, improved cork dispersibility in the polymer matrix, improved cork wettability in the polymer matrix, improved torque release for flow improvement during extrusion, reduction or elimination of melt fracture during extrusion, reduced die build-up, improved speed and increased output, melt viscosity, melt flow rate, melt index, thermal stability, and/or surface properties. The processing aid or processing aids preferably assist in improving mechanical and performance properties of the closure, such as cell size and/or cell density of the plastic material, cell stability, homogeneous distribution of the plurality of particles throughout the polymer matrix, viscosity under conditions of varying shear and/or temperature, in particular increased shear and/or temperature, and the like. One particular advantage that has been observed with the processing aid or processing aids is that the density of the plastic material in the closure can be reduced compared to the density of plastic material in closures not comprising one or more processing aids according to the invention. The lower density of the plastic material contributes to achieving the objects of the invention, such as, for example, reduced plastic material content of the closure, elasticity, compressibility, and uniform distribution of the plurality of particles throughout the plastic material. As the processing aid or processing aids remain in the closure after its production, they are preferably suitable for use in food applications. It is preferred that one or more of the processing aid or processing aids is or are one or more of biodegradable, compostable, and thermoplastically procesable. While it is possible that a single processing aid achieves all or most of the desired advantages, it is also possible that the processing aid comprises two or more processing aids. A suitable processing aid that can be used alone or in combination with one or more other processing aids can be, for example, a lubricant, a slip agent, a release agent, an antiblocking agent, or any agent or combination of agents that achieves one or more of the desired advantages.

Suitable processing aids that can be comprised in the closure according to the invention are preferably selected from the group consisting of fatty acids; fatty acid esters; fatty acid amides; waxes; wax esters; ester waxes; plasticisers; alcohols; glycerol esters; polyol esters; polyol partial esters; polyglycol esters; fatty acid polyglycol esters; fatty acid polyglycol ethers; fatty alcohol polyglycol ethers; metallic soaps; fluoropolymers; polyols; silicones; glycerol monostearate; fatty acid esters of polyols; high molecular weight poly esters; and combinations of any two or more thereof. A suitable processing aid could also be a polymer blend resulting in a large molecular weight dispersity. For example, a processing aid might comprise a combination of higher molecular weight polymer with lower molecular weight polymer such that a broad molecular weight distribution is achieved which provides a lower melt viscosity. The polymer or polymers in such a polymer blend may be the same as one or more of the thermoplastic polymer or polymers comprised in the plastic material that forms the body of the closure, in particular the core member of the closure, or the entire closure if no peripheral layer is comprised. In this case the amount of plastic material is increased by the amount of processing aid as disclosed herein. The polymer or polymers in such a polymer blend may also be different to at least one or more of the thermoplastic polymer or polymers comprised in the plastic material, such that the different polymer or polymer blend is comprised in the amount disclosed herein for the one or more processing aids. Such a polymer blend may be used as processing aid or processing aids, or may be used in combination with one or more of the other processing aids disclosed herein.

If two or more processing aids are employed, these preferably complement or supplement each other in terms of achieving the properties and advantages mentioned herein. For example, the processing aid can comprise at least one processing aid that reduces the melt viscosity of the plastic material, and at least one processing aid that aids the release of the plastic material from forming equipment, such as at least one processing aid that reduces the friction of the plastic material relative to at least one extruder surface during extrusion, and/or at least one processing aid that aids the release of the plastic material from a mould. The processing aid that reduces the friction of the plastic material relative to at least one extruder surface during extrusion may be the same as the processing aid that aids the release of the plastic material from a mould, or these may be different processing aids.

The one or more processing aids may be selected from processing aids as described herein. Any processing aid may be combined with any other processing aid, in order to achieve the objectives and advantages of the present invention. According to a preferred aspect of the closure according to the invention, at least one processing aid that reduces the melt viscosity of the plastic material is selected from the group consisting of fatty acids; fatty acid esters; fatty acid amides; waxes; wax esters; ester waxes; plasticisers; alcohols; glycerol esters; polyol esters; polyol partial esters; polyglycol esters; fatty acid polyglycol esters; fatty acid polyglycol ethers; fatty alcohol polyglycol ethers; glycerol monostearate; metallic soaps; and combinations of any two or more thereof; and at least one processing aid that reduces the friction of the plastic material relative to at least one extruder surface during extrusion is selected from the group consisting of fatty acids; fatty acid esters; fatty acid amides; fluoropolymers; polyols; silicones; glycerol esters; glycerol monostearate; polyol esters; polyol partial esters; polyglycol esters; fatty acid polyglycol esters; fatty acid polyglycol ethers; fatty alcohol polyglycol ethers; fatty acid esters of polyols; wax esters; ester waxes; metallic soaps; high molecular weight poly esters; and combinations of any two or more thereof.

It can be advantageous in the closure according to the invention that, at atmospheric pressure, at least one processing aid is solid or at least partially solid at temperatures up to 160° C., or at temperatures up to 150° C., or at temperatures up to 140° C., or at temperatures up to 130° C., or at temperatures up to 120° C. Optionally at least one processing aid comprises one or more fatty acid derivatives that are solid or at least partially solid at temperatures up to 160° C., or at temperatures up to 150° C., or at temperatures up to 140° C., or at temperatures up to 130° C., or at temperatures up to 120° C., at atmospheric pressure. This can be advantageous in terms of transport and storage of a processing aid, as well as in combining a processing aid with the plastic material and the plurality of particles, which can occur in a dry blending step, to form a homogeneous combination of processing aid with plastic material and plurality of particles. It is also preferred that the processing aid, which at least substantially remains in the closure after formation of the closure, can be solid at use temperatures of the closure, for example in order to avoid bleeding of the processing aid or oily feel of the closure. It can be advantageous for processing and/or combining if the processing aid is softened, melted, or partially melted at processing temperatures. Typical processing temperatures are indicated herein in connection with the method of forming a closure.

It can be advantageous in the closure according to the invention that, at atmospheric pressure, at least one processing aid is at least partially in liquid form, for example at least partially in the form of a melt, at temperatures above 50° C. Optionally at least one processing aid comprises one or more fatty acid derivatives that are at least partially in liquid form at temperatures above 50° C. at atmospheric pressure. This could allow lower processing temperatures, while substantially not leading to bleeding of the processing aid from a finished closure or oily feel of a closure.

A processing aid suitable for the closure according to the invention, can, for example, comprise one or more processing aids selected from the group consisting of fatty acid derivatives derived from a saturated or unsaturated fatty acid having from 12 to 45 carbon atoms, preferably from 25 to 38 carbon atoms; modified fatty acid derivatives derived from a modified, saturated or unsaturated fatty acid having from 12 to 45 carbon atoms, preferably from 25 to 38 carbon atoms; natural waxes; synthetic waxes; plasticizers; and combinations of two or more thereof. By way of example, the processing aid can comprise one or more fatty acid derivatives and/or modified fatty acid derivatives derived from a fatty acid selected from the group consisting of lauric acid, palmitic acid, arachidic acid, behenic acid, stearic acid, 12-hydroxystearic acid, oleic acid, erucic acid, recinolic acid, adipic acid, sebacic acid, myristoleic acid, palmitoleic acid, sapienic acid, elaidic acid, vaccenic acid, linoleic acid, linoelaidic acid, alpha-linolenic acid, gamma-linolenic acid, dihomo-gamma-linolenic acid, arachidonic acid, eicosapentaenoic acid, docosahexaenoic acid, caprylic acid, capric acid, myristic acid, lignoceric acid, cerotic acid, tridecylic acid, pentadecylic acid, margaric acid, nonadecylic acid, heneicosylic acid, tricosylic acid, pentacosylic acid, heptacosylic acid, montanic acid, nonocosylic acid, melissic acid, henatriacontylic acid, lacceroic acid, psyllic acid, geddic acid, ceroplastic acid, hexatriacontylic acid, heptatriacontanoic acid, octatriacontanoic acid, stearidonic acid, docosatetraenoic acid, palmitoleic acid, vaccenic acid, paullinic acid, elaidic acid, gondoic acid, nervonic acid, mead acid, modified fatty acids derived from one or more of the fatty acids comprised in the group, and mixtures of any two or more of the fatty acids and modified fatty acids comprised in the group.

It can be advantageous for the closure according to the invention if the processing aid comprises one or more processing aids selected from the group consisting of erucamides; fatty acids; waxes; stearamides; glycerol monostearate; high-mono glycerol monostearate; glycerol ester; ethylene-bis-stearamide; calcium stearate; erucic acid amide; oleic acid amide; stearic acid amide; trimellitate esters; adipate esters; sebacate esters; azelaic esters; diesters; polymer plasticizers; and any combination of two or more thereof.

The processing aid can, for example, have one or more of the following properties:

a dropping point measured according to ASTM D2265 in the range of from 50° C. to 160° C., or in the range of from 50° C. to 150° C., or in the range of from 50° C. to 140° C., or in the range of from 50° C. to 130° C., in the range of from 50° C. to 120° C.;

a specific gravity in the range of from 0.900 to 1.300, measured according to ASTM D1298-12b, relative to water at 4° C.

In the closure according to the invention, the components (a), (b) and (c) are preferably comprised in the following weight percent amounts, based on the total weight of the closure:

(a) 10 wt. % to 59.9 wt. %, preferably from 20 wt. % to 59 wt. %, preferably from 30 wt. % to 55 wt. %, preferably from 30 wt. % to 50 wt. %, preferably from 35 wt. % to 50 wt. %, preferably from 35 wt. % to 49.9 wt. %, preferably from 35 wt. % to 49 wt. %, preferably from 35 wt. % to 48 wt. %, preferably from 35 wt. % to 47 wt. %, preferably from 35 wt. % to 46 wt. %, preferably from 35 wt. % to 45 wt. %, preferably from 40 wt. % to 45 wt. %, preferably from 40 wt. % to 44.9 wt. %, of the plastic material;

(b) 40 wt. % to 85 wt. %, preferably from 40 wt. % to 80 wt. %, preferably from 40 wt. % to 75 wt. %, preferably from 40 wt. % to 70 wt. %, preferably from 45 wt. % to 70 wt. %, preferably from 45 wt. % to 65 wt. %, preferably from 45 wt. % to 60 wt. %, preferably from 50 wt. % to 59 wt. %, preferably from greater than 50 wt. % to 59 wt. %, preferably from 51 wt. % to 55 wt. %, of the plurality of particles;

(c) 0.1 wt. % to 10 wt. %, preferably from 0.50 wt. % to 10 wt. %, preferably from 0.8 wt. % to 8 wt. %, preferably from 1 wt. % to 7 wt. %, preferably from 1 wt. % to 6 wt. %, preferably from 1 wt. % to 5 wt. %, preferably from 2 wt. % to 5wt. %, preferably from 2 wt. % to 4 wt. %, of the one or more processing aid.

The closure according to the invention preferably does not comprise a binder; and/or the closure preferably does not comprise a crosslinking agent; and/or the plastic material is preferably not crosslinked by means of a crosslinking agent. Preferably the closure does not comprise a binder and does not comprise a crosslinking agent. The known closures comprising larger quantities, for example greater than about 50 wt. % based on the total weight of the closure, of cork powder or cork particles are generally agglomerates, in which the binder is typically a polyurethane or polyacrylate glue formed by means of in situ reactive polymerization of corresponding monomers and/or prepolymers, such as oligomers. These binders or glues are not thermoplastically proces sable, nor are they thermoplastic polymers or plastic materials according to the definition of the present invention. Known closures often comprise one or more crosslinking agents, also referred to as crosslinkers, in order to improve certain properties. Not only binders, or their monomers, but also crosslinkers, can give rise to food safety concerns. In addition, typically neither binders nor crosslinked polymers are either biodegradable or thermoplastically processable. It is thus generally not possible to recycle, biodegrade or compost a closure comprising binders or crosslinkers or crosslinked polymers. However, while it is preferred that the closure according to the invention does not comprise crosslinker, it is possible that the closure according to the invention comprises a small amount of crosslinker, for example in an amount sufficient to modify in a desired way the rheology of the composition used to prepare the closure, in particular the rheology of the thermoplastic component thereof, and/or to modify one or more other properties of the closure and/or of the composition used to prepare the closure, in particular of the thermoplastic component thereof, such as viscosity, elasticity, and/or hardness. The amount of crosslinker, if present, should be small enough so that the thermoplastic processability of the closure is not affected, or at least is substantially not affected, in particular the recyclability of the closure is not affected, or at least is substantially not affected.

In one embodiment of the present disclosure, the closure is produced by a process comprising at least a process step of extrusion. For closures comprising a core member and at least one peripheral layer, this allows to achieve integral bonded interconnection between the at least one peripheral layer and the core member, since the at least one peripheral layer is formed about the core member in a manner which assures intimate bonded engagement.

According to a particular aspect of the closure, composition and methods according to the present disclosure, the temperature of the composition, the closure, and/or any method step, particularly during formation of a closure or a composition, preferably does not exceed 200° C., preferably is maintained in the range of from about 120° C. to about 170° C., or in the range of from about 125° C. to about 170° C., or in the range of from about 130° C. to about 165° C., or in the range of from about 135° C. to about 165° C., or in the range of from about 140° C. to about 160° C. An extrusion temperature in the disclosed range is particularly maintained during extrusion of a material comprising cork particles. If the temperature exceeds this range there is a risk of discoloration and/or degradation of the cork particles, as well as burnt aromas which could affect a food product coming into contact with the closure.

It has also been found that further additional additives may be incorporated into the closure of the present disclosure. For a closure according to the disclosure comprising a core member and at least one peripheral layer, the additives may be incorporated into either the core member and/or the at least one peripheral layer of the closure in order to provide further enhancements and desirable performance characteristics. These additional additives can include, for example, coloring agents, such as pigments, antimicrobial agents, antibacterial compounds, and/or oxygen scavenging materials. Suitable additives are known to the person skilled in the art. The antimicrobial and antibacterial additives can be incorporated into the closure to impart an additional degree of confidence that in the presence of a liquid the potential for microbial or bacterial growth is extremely remote. These additives preferably have a long-term time release ability and further increase the shelf life without further treatments by those involved with the bottling of wine. Furthermore, it is possible for the cells of the closure to be substantially filled with a non-oxidizing gas, in order to further reduce oxygen ingress into the container. Ways of achieving this are known in the prior art. It is possible for one or more fillers, preferably particulate fillers, preferably particulate fillers having a particle size less than 0.2 mm, to be incorporated into the closure according to the invention, preferably by being incorporated into the composition for preparing the closure according to the invention. Preferred fillers are inorganic fillers such as mineral fillers, which may be selected from talc, chalk, silica, mica, alumina, clay, calcium carbonate, magnesium carbonate, calcium aluminate, titanium dioxide, vermiculite, perlite, and combinations of one or more thereof. It can be advantageous to include one or more fillers, for example to modify the rheology or other properties of the closure and/or of the composition, Depending upon the sealing process to be employed for inserting the closure of the present disclosure in a desired bottle, additives, such as slip additives, lubricating agents, and sealing compounds may be incorporated into a peripheral layer if the closure of the present disclosure comprises a core member and at least one peripheral layer, for example to provide lubrication of the closure during the insertion process. In addition, other additives typically employed in the bottling industry may be incorporated into the closure of the present disclosure for improving the sealing engagement of the closure with the bottle as well as reducing the extraction forces necessary to remove the closure from the bottle for opening the bottle.

The closures according to the present disclosure may comprise decorative indicia such as letters, symbols, colors, graphics, and wood tones printed on at least one peripheral surface and/or one or both of the terminating surfaces forming the opposed ends of said closure or stopper. If present, at least one peripheral layer can be in overlying relationship with the indicia printed on the peripheral surface. Printing of these indicia can be performed in-line, during production of the closure or in a separate step after the closure has been manufactured. Accordingly, the closure of the present disclosure may comprise a decorative effect on at least one of the peripheral surface, in particular substantially cylindrical surface and one or both terminating ends, in particular substantially flat terminating surfaces forming the opposed ends of said closure or stopper. Additionally, indicia comprising ink that is invisible under normal lighting and/or temperature conditions can be comprised in the closure. Normal lighting conditions in the context of this disclosure means light from a light source having a spectrum that substantially comprises the visible range of the spectrum. Normal temperature conditions in the context of this disclosure means a temperature from 10° C. to 35° C. These indicia can, for example, be useful as registration marks.

The closure according to the present disclosure can further comprise a lubricant layer on at least one of its surfaces, in particular on its peripheral surface. The lubricant layer can comprise, for example, one or more of a silicone, a wax, a paraffin, and a Teflon® layer, or any type of layer known for natural cork or synthetic closures. Such a layer can help for example with insertion of the closure into a container and be formed by any means known and appearing suitable. If a silicone, wax and/or paraffin layer is present, this can be formed, for example, by extrusion and/or by tumbling.

By employing the materials and methods disclosed herein, a highly effective, multi-layer closure can be attained which is able to provide at least one, particularly more than one, particularly almost all or even all properties suitable for a wine bottle closure.

The closure according to the present disclosure has advantageous properties making it particularly suitable for packaging and in particular for use as a closure for wine bottles. If the product is packaged under inert conditions, the closure advantageously has an oxygen ingress rate measured according to ASTM F1307 of less than about 3 mg oxygen per container in the first 100 days after closing the container. The oxygen ingress rate is advantageously selected from the group consisting of less than about 1 mg oxygen, less than about 0.5 mg oxygen, less than about 0.25 mg oxygen, less than about 0.2 mg oxygen and less than about 0.1 mg oxygen, per container in the first 100 days after closing the container. The closure according to the present disclosure or produced according to the methods of the present disclosure achieves at least a comparable performance to known closures from alternative materials such as polymers with respect to use as a closure for wine bottles, as measured by, for example, at least one of, particularly more than one of, particularly all of the properties of oxygen transfer rate, extraction force, and leakage. In addition, the closure according to the present disclosure or produced according to the methods of the present disclosure has an appearance resembling that of natural cork and can in some aspects preferably be branded in the same way as a natural cork closure. Furthermore, the tactile properties of the closure according to the present disclosure are very similar to a closure from natural cork.

The closure according to the invention preferably has an oxygen transfer rate measured according to ASTM F1307 in 100% oxygen of less than 0.05 cc/day, preferably in the range of from 0.0001 cc/day to 0.05 cc/day, or from about 0.0001 cc/day/closure to about 0.1000 cc/day/closure, or from about 0.0005 cc/day/closure to about 0.050 cc/day/closure.

The details and properties of all components of the inventive closure also apply to the compositions and methods according to the present disclosure as described hereinbelow.

Advantageously, the closure according to the present disclosure has an extraction force determined according to the herein described test method of not more than about 445 N (100 lb), particularly of not more than about 440 N, particularly of not more than about 430 N, particularly of not more than about 420 N, particularly of not more than about 410 N, preferably not more than about 400 N, particularly of not more than about 390 N, particularly of not more than about 380 N, particularly of not more than about 370 N, particularly of not more than about 360 N, particularly of not more than about 350 N, particularly of not more than about 340 N, particularly of not more than about 330 N, more particularly of not more than about 320 N, more particularly of not more than about 310 N, more particularly of not more than about 300 N, whereby extraction forces in the range of from about 200 N to about 400 N, particularly in the range of from about 210 N to about 380 N, particularly in the range of from about 220 N to about 350 N, particularly in the range of from about 230 N to about 300 N are advantageously achieved. The extraction force describes the force needed to remove a closure from a container, in particular from a bottle, under standardized conditions. A lower extraction force relates to a greater ease of extraction of the closure. An extraction force in the range of from about 150 N to about 445 N is generally considered acceptable for a wine bottle closure. The presently disclosed closures achieve extraction force within the range considered acceptable for wine bottle closures.

The present invention also relates to a composition for use in manufacturing a closure for a product-retaining container, in particular by means of extrusion and/or moulding. The composition is preferably suitable for use in extrusion methods, but is also suitable for use in moulding methods such as injection moulding or compression moulding. A preferred composition for use in manufacturing a closure for a product-retaining container comprises as components:
(a) a plastic material comprising one or more thermoplastic polymers;
(b) a plurality of particles comprising cork and having a particle size distribution $D_{50}$ measured by mechanical sieving according to ISO ICS 19.120 in the range of from 0.20 millimeters to 10 millimeters;
(c) one or more processing aids;
(d) optionally, one or more additives; and
(e) one or more blowing agents.

The plastic material, thermoplastic polymers, plurality of particles, processing aids, additives, and blowing agents, and all details relating thereto, including preferred embodiments and aspects, are as defined herein with respect to the closure, the composition for forming a closure, the method for forming a composition, and the method for forming a closure.

In addition to additives already mentioned herein relating to the inventive closure, which can be provided as component (d), other additives that can also be provided as component (d), can be, for example, at least one nucleating agent, a colouring agent, or other additives as defined herein or as known to the person skilled in the art, including one or more types of filler as defined herein. Details regarding such additives are preferably the same as the details regarding additives described herein with respect to the closure of the present disclosure.

In a preferred composition for use in manufacturing a closure for a product-retaining container, the components (a), (b), (c), (d) and (e) are comprised in the following weight percent amounts, based on the total weight of the composition:
(a) 10 wt. % to 59.8 wt. %, preferably from 20 wt. % to 59 wt. %, preferably from 30 wt. % to 55 wt. %, preferably from 30 wt. % to 50 wt. %, preferably from 35 wt. % to 50 wt. %, preferably from 35 wt. % to 49.9 wt. %, preferably from 35 wt. % to 49 wt. %, preferably from 35 wt. % to 48 wt. %, preferably from 35 wt. % to 47 wt. %, preferably from 35 wt. % to 46 wt. %, preferably from 35 wt. % to 45 wt. %, preferably from 40 wt. % to 45 wt. %, preferably from 40 wt. % to 44.9 wt. %, of the plastic material;
(b) 40 wt. % to 85 wt. %, preferably from 40 wt. % to 80 wt. %, preferably from 40 wt. % to 75 wt. %, preferably from 40 wt. % to 70 wt. %, preferably from 45 wt. % to 70 wt. %, preferably from 45 wt. % to 65 wt. %, preferably from 45 wt. % to 60 wt. %, preferably from 50 wt. % to 59 wt. %, preferably from greater than 50 wt. % to 59 wt. %, preferably from 51 wt. % to 55 wt. %, of the plurality of particles;
(c) 0.1 wt. % to 10 wt. %, preferably from 0.50 wt. % to 10 wt. %, preferably from 0.8 wt. % to 8 wt. %, preferably from 1 wt. % to 7 wt. %, preferably from 1 wt. % to 6 wt. %, preferably from 1 wt. % to 5 wt. %, preferably from 2 wt. % to 5 wt. %, preferably from 2 wt. % to 4 wt. %, of the one or more processing aids;
(d) 0 wt. % to 10 wt. %, preferably from 0.1 wt. % to 10 wt. %, preferably from 0.50 wt. % to 10 wt. %, preferably from 0.8 wt. % to 8 wt. %, preferably from 1 wt. % to 7 wt. %, preferably from 1 wt. % to 6 wt. %, preferably from 1 wt. % to 5 wt. %, preferably from 2 wt. % to 5 wt. %, preferably from 2 wt. % to 4 wt. %, of the one or more additives; and
(e) 0.1 wt. % to 10 wt. %, preferably from 0.50 wt. % to 10 wt. %, preferably from 0.8 wt. % to 8 wt. %, preferably from 1 wt. % to 7 wt. %, preferably from 1 wt. % to 6 wt. %, preferably from 1 wt. % to 5 wt. %, preferably from 2 wt. % to 5 wt. %, preferably from 2 wt. % to 4 wt. %, of the one or more blowing agents.

It is possible that the composition does not comprise any further components. In this case, in the composition for use in manufacturing a closure for a product-retaining container, the weight percent amounts of components (a), (b), (c), (d) and (e) should add up to 100 wt. %

The invention also relates to a method for obtaining a composition for use in manufacturing a closure for a product-retaining container, comprising at least the following method step:
i. intimately combining the following components:
   (a) a plastic material comprising one or more thermoplastic polymers, the plastic material preferably being in the form of a powder or in the form of a granulate;
   (b) a plurality of particles comprising cork and having a particle size distribution $D_{50}$ measured by means of mechanical sieving according to ISO ICS 19.120 in the range of from 0.2 millimeters to 10 millimeters;
   (c) one or more processing aids;
   (d) optionally, one or more additives; and
   (e) one or more blowing agents.

The plastic material, thermoplastic polymers, plurality of particles, processing aids, additives, and blowing agents, and all details relating thereto, including preferred embodiments and aspects, are as defined herein with respect to the closure, the composition for forming a closure, the method for forming a composition, and the method for forming a closure.

The combination in method step i. of the present disclosure is preferably carried out by means of any one or more of blending, dry blending, compounding, mixing, melting, pultrusion, extrusion, or any other method known to the skilled person and appearing suitable. It is possible for method step i. to be carried out as a single step, comprising combination of all components in a single step to form the composition. It is also possible to first prepare a masterbatch comprising the plastic material and the plurality of particles, for example by means of any one or more of blending, dry blending, compounding, mixing, melting, pultrusion, extrusion, or any other method known to the skilled person and appearing suitable, and subsequently to combine the masterbatch with the other components to form the composition. A masterbatch comprising the plastic material and the plurality of particles can be prepared, for example in the form of pellets, or any other form suitable for use in a subsequent method step, such as a step comprising combination or extrusion. The combination of this masterbatch with the other components can then be carried out by means of any one or more of blending, dry blending, compounding, mixing, melting, pultrusion, extrusion, or any other method known to the skilled person and appearing suitable, to form the composition. During combination with blowing agent, the temperature is maintained below the initiation temperature for the blowing agent or agents, unless it is desired to foam the plastic material. These initiation temperatures depend on the blowing agent or agents and are known or available to the skilled person.

In a preferred method for forming a composition for use in manufacturing a closure for a product-retaining container, the components (a), (b), (c), (d) and (e) are comprised in the following weight percent amounts, based on the total weight of the composition:
(a) 10 wt. % to 59.8 wt. %, preferably from 20 wt. % to 59 wt. %, preferably from 30 wt. % to 55 wt. %, preferably from 30 wt. % to 50 wt. %, preferably from 35 wt. % to 50 wt. %, preferably from 35 wt. % to 49.9 wt. %, preferably from 35 wt. % to 49 wt. %, preferably from 35 wt. % to 48 wt. %, preferably from 35 wt. % to 47 wt. %, preferably from 35 wt. % to 46 wt. %, preferably from 35 wt. % to 45 wt. %, preferably from 40 wt. % to 45 wt. %, preferably from 40 wt. % to 44.9 wt. %, of the plastic material;

(b) 40 wt. % to 85 wt. %, preferably from 40 wt. % to 80 wt. %, preferably from 40 wt. % to 75 wt. %, preferably from 40 wt. % to 70 wt. %, preferably from 45 wt. % to 70 wt. %, preferably from 45 wt. % to 65 wt. %, preferably from 45 wt. % to 60 wt. %, preferably from 50 wt. % to 59 wt. %, preferably from greater than 50 wt. % to 59 wt. %, preferably from 51 wt. % to 55 wt. %, of the plurality of particles;

(c) 0.1 wt. % to 10 wt. %, preferably from 0.50 wt. % to 10 wt. %, preferably from 0.8 wt. % to 8 wt. %, preferably from 1 wt. % to 7 wt. %, preferably from 1 wt. % to 6 wt. %, preferably from 1 wt. % to 5 wt. %, preferably from 2 wt. % to 5 wt. %, preferably from 2 wt. % to 4 wt. %, of the one or more processing aids;

(d) 0 wt. % to 10 wt. %, preferably from 0.1 wt. % to 10 wt. %, preferably from 0.50 wt. % to 10 wt. %, preferably from 0.8 wt. % to 8 wt. %, preferably from 1 wt. % to 7 wt. %, preferably from 1 wt. % to 6 wt. %, preferably from 1 wt. % to 5 wt. %, preferably from 2 wt. % to 5 wt. %, preferably from 2 wt. % to 4 wt. %, of the one or more additives; and (e) 0.1 wt. % to 10 wt. %, preferably from 0.50 wt. % to 10 wt. %, preferably from 0.8 wt. % to 8 wt. %, preferably from 1 wt. % to 7 wt. %, preferably from 1 wt. % to 6 wt. %, preferably from 1 wt. % to 5 wt. %, preferably from 2 wt. % to 5 wt. %, preferably from 2 wt. % to 4 wt. %, of the one or more blowing agents.

The invention also relates to a composition obtainable by the method disclosed herein for forming a composition for use in manufacturing a closure for a product-retaining container.

The plastic material, thermoplastic polymers, plurality of particles, processing aids, additives, and blowing agents, and all details relating thereto, including preferred embodiments and aspects, are as defined herein with respect to the closure, the composition for forming a closure, the method for forming a composition, and the method for forming a closure.

The one or more blowing agent is preferably selected from the group consisting of expandable microspheres, chemical blowing agents, physical blowing agents, and combinations of two or more thereof, as defined herein. Particularly preferably the blowing agent is or comprises expandable microspheres.

The present disclosure further relates to a method for producing a closure according to the present disclosure. According to a preferred method for manufacturing a closure for a product-retaining container constructed for being inserted and securely retained in a portal-forming neck of said container, said method comprises at least the following method steps:
i. intimately combining the following components, to form a composition:
   (a) a plastic material comprising one or more thermoplastic polymers, the plastic material preferably being in the form of a powder or in the form of a granulate;
   (b) a plurality of particles comprising cork and having a particle size distribution $D_{50}$ measured by means of mechanical sieving according to ISO ICS 19.120 in the range of from 0.20 millimeters to 10 millimeters;
   (c) one or more processing aids;
   (d) optionally, one or more additives; and
   (e) one or more blowing agents;
ii. heating the composition obtained in step i., preferably under increased pressure, in particular at a pressure above atmospheric pressure, to form a melt;

iii. forming by means of extrusion or molding a closure precursor from the melt obtained in step ii.;
iv. optionally cutting and/or finishing the closure precursor to form the closure.

The plastic material, thermoplastic polymers, plurality of particles, processing aids, additives, and blowing agents, and all details relating thereto, including amounts, preferred embodiments and aspects, as well as details relating to method steps, are as defined herein with respect to the closure, the composition for forming a closure, the method for forming a composition, and the method for forming a closure. The closure may be a cylindrical closure, comprising a peripheral surface and two substantially flat terminating end surfaces, such as a closure for a still wine bottle. Alternatively, the closure may be in the form of a closure for a sparkling wine bottle.

The plurality of particles is preferably a plurality of clean particles, as defined herein. It is conceivable to carry out at least one step of washing the plurality of particles, in particular to remove all or substantially all haloanisoles, in particular TCA, but also optionally TBA, TeCA and/or PCA, as disclosed herein. A closure produced by a method disclosed herein preferably has a content of releasable trichloroanisole of less than 6 ng/L, preferably less than 5 ng/L, preferably less than 4 ng/L, preferably less than 3 ng/L, preferably less than 2 ng/L.

The method can be continuous or discontinuous. In a continuous method, the combining in method step i. can take place by means of any one or more of blending, dry blending, mixing, melting, pultrusion, extrusion, compounding, or any other method known to the skilled person and appearing suitable. Preferably, method step i. of any method defined herein involves applying shear to the components, preferably applying shear while heating. The composition resulting from method step i., which can be, for example, in the form of a dry blend or a melt, is then fed continuously to a moulding device or an extrusion device. The heating in method step ii. can be carried out at a time selected from during method step i.; after method step i. and before method step iii.; during method step iii.; or any combination of two or more thereof. In a preferred aspect of method steps i. and ii., which may be combined with any other aspect of the method according to the invention or any method step according to the invention, method step i. is carried out at atmospheric pressure or at a pressure below atmospheric pressure, and method step ii. is carried out at a pressure above atmospheric pressure. Preferably heating is carried out at least during method step iii. In a discontinuous method, any or all method steps can be discontinuous, or one or more method steps can be continuous or discontinuous. For example, a masterbatch of the composition can be pre-prepared in method step i., or a masterbatch of the plastic material and the plurality of particles can be pre-prepared as defined herein with respect to the composition, and optionally stored before further method steps. If a masterbatch of the plastic material and the plurality of particles are pre-prepared, this is then combined with all other components in method step i. of any method as described herein. In a discontinuous method, if one or more blowing agents are combined in a discontinuous method step, care must be taken that the temperature to which the blowing agent or blowing agents are exposed is below the initiation temperature for the blowing agent or agents, unless it is intended that the blowing agent or agents are combined during the method step in which foaming takes place. The respective initiation temperature depends on the blowing agent and is known or available to the skilled person.

The heating in method step ii. preferably occurs to a temperature at which the composition provided in method step i. can be foamed to the desired density, and/or the composition can be extruded or moulded to form the closure precursor. If a blowing agent is used which requires heat to provide or initiate the blowing effect, the heating in method step ii. preferably occurs to a temperature at which this blowing effect can occur. The blowing agent is preferably selected from the group consisting of expandable microspheres, chemical blowing agents, physical blowing agents, and combinations of two or more thereof. If the blowing agent comprises or consists of expandable microspheres, a temperature is selected at which the expandable microspheres expand to form expanded microspheres. The expanded microspheres form the individual cells of the plurality of cells. A temperature is preferably selected at which the expanded microspheres have a desired cell size. Suitable temperatures depend principally on the thermoplastic polymer and blowing agent selected and can be easily determined by the skilled person based on the known properties of the thermoplastic polymer and blowing agent and/or based on simple trials. The heating temperature is preferably maintained in the range of from about 120° C. to about 170° C. This temperature range is preferred for all method steps that involve heating, in particular method steps that involve heating a composition comprising cork particles, including mixing, combining, extruding and moulding. The maintaining of an extrusion or moulding temperature in this range is particularly envisaged during extrusion or moulding of any composition comprising cork powder. In this way, for example, discoloration can be avoided. Should discoloration nonetheless occur this can be at least partially corrected, for example by addition of colorants or other additives. During the heating step ii. the plastic material is preferably foamed. Particularly preferably the plastic material is foamed to a foam density in the range of from about 25 kg/m$^3$ to 800 kg/m$^3$, preferably in the range of from about 50 kg/m$^3$ to 800 kg/m$^3$, preferably in the range of from about 75 kg/m$^3$ to 800 kg/m$^3$, preferably in the range of from about 100 kg/m$^3$ to 800 kg/m$^3$, preferably in the range of from about 150 kg/m$^3$ to 700 kg/m$^3$, preferably in the range of from about 150 kg/m$^3$ to 600 kg/m$^3$, preferably in the range of from about 150 kg/m$^3$ to 500 kg/m$^3$, preferably in the range of from about 180 kg/m$^3$ to 500 kg/m$^3$, or in the range of from about 200 kg/m$^3$ to 450 kg/m$^3$, preferably in the range of from about 200 kg/m$^3$ to 420 kg/m$^3$.

Method step iii. can be carried out in any way known to the skilled person and appearing suitable, in particular using known extrusion equipment or known moulding equipment. The use of the composition according to the invention means it is not necessary to modify the extrusion equipment or the moulding equipment, or any surfaces thereof, nor to modify significantly process or equipment parameters, for example to provide additional heating, in order to prevent undesirable phenomena such as surface melt fracture or surface roughness. This is particularly advantageous in large scale production facilities, particularly in a continuous production process, where it could be impractical, time consuming and expensive to modify significantly equipment and/or process parameters upon switching production from one type of closure to a different type of closure. This applies to all method steps, but especially to heating step ii. as well as to forming step iii.

If a peripheral layer is formed in the inventive method, the details regarding the peripheral layer composition are the same as the details regarding suitable materials, compounds and compositions described herein with respect to a peripheral layer of the closure of the present disclosure. Any peripheral layer, if present, is preferably formed by means of co-extrusion as described herein and known to the skilled person, which is preferably carried out substantially simultaneously with method step iii. According to a further aspect of the method according to the present disclosure, a method step to form a peripheral layer can be repeated one or more times in order to obtain one or more further peripheral layers, whereby the one or more further peripheral layers are separately extruded in intimate bonded engagement with the cylindrical outer surface of the previous peripheral layer to form a multilayer elongated cylindrical structure.

After the extrusion in method step iii., optionally with co-extrusion of one or more peripheral layers, the closure precursor, which is in the form of a continuous elongated cylindrical length of plastic material or a multi-layer elongated structure, can be cooled by methods known to the skilled person. These include, for example, passing through a cooling bath, spraying, blowing and the like.

If the closure precursor is formed in method step iii. by means of extrusion, it is cut in method step iv. into lengths suitable for closures. If the closure precursor is formed in method step iii. by means of moulding, it is not necessary to carry out cutting in method step iv. The closure is preferably rectified in method step iv. In particular, the peripheral surface and optionally also the end surfaces of the closure are smoothed, for example by means of sanding, grinding, or polishing, preferably polishing, as is known for natural cork closures. The optional finishing in method step iv., which can be applied to the cut lengths or to moulded closure precursors, can be, for example, printing, coating, or post-treating, any or all of which can be carried out in any way known and appearing suitable to the skilled person. Post-treating can comprise, for example, surface treatments such as plasma treatment, corona treatment, or providing a lubricant to the surface of the closure. If the outermost peripheral surface comprises cork particles, it may be desirable and/or possible to use branding to impart an image or writing onto the peripheral surface or one or both terminating surfaces of the closure, for example using branding methods known for natural cork closures.

It is preferred for the method according to the invention for forming a closure, that the components (a), (b), (c), (d) and (e) are comprised in the following weight percent amounts, based on the total weight of the composition:
- (a) 10 wt. % to 59.8 wt. %, preferably from 20 wt. % to 59 wt. %, preferably from 30 wt. % to 55 wt. %, preferably from 30 wt. % to 50 wt. %, preferably from 35 wt. % to 50 wt. %, preferably from 35 wt. % to 49.9 wt. %, preferably from 35 wt. % to 49 wt. %, preferably from 35 wt. % to 48 wt. %, preferably from 35 wt. % to 47 wt. %, preferably from 35 wt. % to 46 wt. %, preferably from 35 wt. % to 45 wt. %, preferably from 40 wt. % to 45 wt. %, preferably from 40 wt. % to 44.9 wt. %, of the plastic material;
- (b) 40 wt. % to 85 wt. %, preferably from 40 wt. % to 80 wt. %, preferably from 40 wt. % to 75 wt. %, preferably from 40 wt. % to 70 wt. %, preferably from 45 wt. % to 70 wt. %, preferably from 45 wt. % to 65 wt. %, preferably from 45 wt. % to 60 wt. %, preferably from 50 wt. % to 59 wt. %, preferably from greater than 50 wt. % to 59 wt. %, preferably from 51 wt. % to 55 wt. %, of the plurality of particles;
- (c) 0.1 wt. % to 10 wt. %, preferably from 0.50 wt. % to 10 wt. %, preferably from 0.8 wt. % to 8 wt. %, preferably from 1 wt. % to 7 wt. %, preferably from 1 wt. % to 6 wt. %, preferably from 1 wt. % to 5 wt. %, preferably from 2 wt. % to 5 wt. %, preferably from 2 wt. % to 4 wt. %, of the one or more processing aids;
- (d) 0 wt. % to 10 wt. %, preferably from 0.1 wt. % to 10 wt. %, preferably from 0.50 wt. % to 10 wt. %, preferably from 0.8 wt. % to 8 wt. %, preferably from 1 wt. % to 7 wt. %, preferably from 1 wt. % to 6 wt. %, preferably from 1 wt. % to 5 wt. %, preferably from 2 wt. % to 5 wt. %, preferably from 2 wt. % to 4 wt. %, of the one or more additives; and
- (e) 0.1 wt. % to 10 wt. %, preferably from 0.50 wt. % to 10 wt. %, preferably from 0.8 wt. % to 8 wt. %, preferably from 1 wt. % to 7 wt. %, preferably from 1 wt. % to 6 wt. %, preferably from 1 wt. % to 5 wt. %, preferably from 2 wt. % to 5 wt. %, preferably from 2 wt. % to 4 wt. %, of the one or more blowing agents.

All details disclosed herein for the closures according to the present disclosure are also relevant for the compositions, methods and uses according to the present disclosure and therefore also form part of the disclosure of the compositions, methods and uses disclosed herein.

The present disclosure also relates to a closure obtainable from a composition disclosed herein, and to a closure obtainable according to a method as described herein. These closures are also closures according to the invention.

The present disclosure also relates to a closure obtainable from a composition disclosed herein, and to a closure obtainable according to a method as described herein, having the features of any closure as defined herein. These closures are also closures according to the invention.

The present disclosure also relates to a use of a closure according to the present invention for sealing closed a container In a preferred embodiment of the use said closure has an oxygen ingress rate measured according to ASTM F1307 of less than about 1 mg oxygen per container in the first 100 days after closing the container. In a further preferred embodiment of the use the oxygen ingress rate is selected from the group consisting of less than about 0.5 mg oxygen, less than about 0.25 mg oxygen, less than about 0.2 mg oxygen and less than about 0.1 mg oxygen, per container in the first 100 days after closing the container.

The present disclosure also relates to a closure system comprising a product-retaining container and a closure according to the present invention.

According to the present disclosure, a closure can be realized which is capable of providing at least one, particularly more than one, particularly almost all or even all of the needs imposed thereupon by the wine industry, as well as any other bottle closure/packaging industry. As a result, a bottle closure can be attained that can be employed for completely sealing and closing a desired bottle for securely and safely storing the product retained therein, optionally with desired markings and/or indicia printed thereon. The disclosure herein concerning the closures of the present disclosure also applies to the closures prepared by the presently disclosed methods. The disclosure herein concerning the closures prepared by the presently disclosed methods also applies to the closures of the present disclosure.

The present disclosure accordingly comprises an article of manufacture possessing the features, properties, and relation of elements which will be exemplified in the article herein described, and the scope of the present disclosure will be indicated in the claims.

BRIEF DESCRIPTION OF THE DRAWINGS

For a fuller understanding of the nature and objects of the present disclosure herein described, reference should be had to the following detailed description taken in connection with the accompanying drawings, in which.

DETAILED DESCRIPTION

By referring to the FIGURES, along with the following detailed disclosure, the construction and production method for the closures of the present disclosure can best be understood. In these Figures, as well as in the detailed disclosure herein, the closure of the present disclosure, is depicted and discussed as a bottle closure for wine products. However, as detailed herein, the present disclosure is applicable as a closure for use in sealing and retaining any desired product in any desired closure system. However, due to the stringent and difficult demands placed upon closures for wine products, the detailed disclosure herein focuses upon the applicability of the bottle closures of the present disclosure as a closure for wine bottles. However, it is to be understood that this detailed discussion is provided merely for exemplary purposes and is not intended to limit the present disclosure to this particular application and embodiment.

Figure 1:
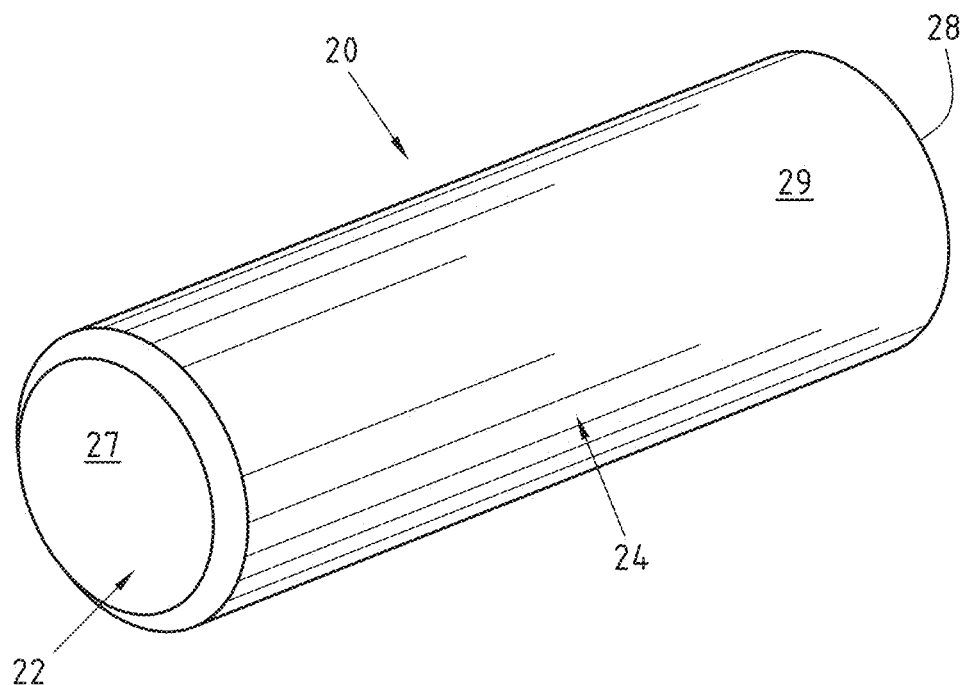
FIG. 1 is a perspective view of a closure according to an aspect of the present disclosure, comprising a peripheral layer.
Figure 2:
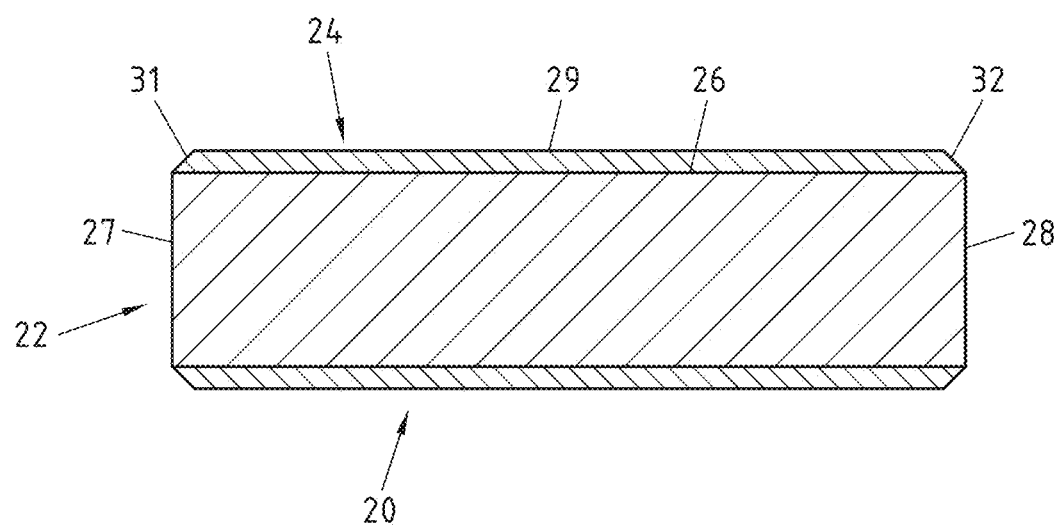
FIG. 2 is a cross sectional-side elevation of a closure according to an aspect of the present disclosure, comprising a peripheral layer.

In FIGS. 1 and 2, the exemplary construction of a closure 20 is depicted comprising a generally cylindrical shape formed by core member 22 and peripheral layer 24 which peripherally surrounds and is intimately bonded to core member 22. In this aspect, core member 22 comprises a substantially cylindrically shaped surface 26, terminating with substantially flat end surfaces 27 and 28. Whenever applicable, the following detailed description of a closure having a layered structure, i.e. a core member and a peripheral layer, shall also apply to closures without a peripheral layer and also to multilayer closures having more than one peripheral layer.

In an exemplary aspect, peripheral layer 24 is intimately bonded directly to core member 22, peripherally surrounding and enveloping surface 26 of core member 22. Peripheral layer 24 incorporates exposed surface 29, which comprises a substantially cylindrical shape and forms the outer surface of bottle closure 20, along with surfaces 27 and 28 of the substantially flat terminating ends.

In order to assist in assuring entry of bottle closure 20 into the portal of the bottle into which closure 20 is inserted, terminating edge 31 may be beveled or chamfered. Similarly, terminating edge 32 may comprise a similar bevel or chamfer. Although any desired bevel or chamfered configuration can be employed, such as a radius, curve, or flat surface, it has been found that by merely cutting ends 31 and 32 with an angle of about 45° or about 60° the desired reduced diameter area is provided for achieving the desired effect. The chamfer angle and the chamfer length, i.e. the length of the chamfered surface as measured between surface 26, or surface 29 if a peripheral layer is comprised, are exemplarily within the ranges described herein for still wine closures or champagne closures.

By incorporating chamfered or beveled ends 31 and 32 on bottle closure 20, automatic self-centering is attained. As a result, when bottle closure 20 is compressed and ejected from the compression jaws into the open bottle for forming the closure thereof, bottle closure 20 is automatically guided into the bottle opening, even if the clamping jaws are slightly misaligned with the portal of the bottle. By employing this configuration, unwanted difficulties in inserting bottle closure 20 into any desired bottle are obviated. However, in applications which employ alternate stopper insertion techniques, chamfering of ends 31 and 32 may not be needed. Further, in order to facilitate the insertion of the closure into the bottle neck, the outer surface can fully or partly be coated with suitable lubricants, for example with silicones. Coating with a lubricant can be carried out by a variety of techniques known in the art, including tumbling and/or extrusion coating. For closures for champagne or sparkling wine, if a silicone lubricant is used a crosslinkable silicone is preferred since silicone can act as an antifoaming agent.

In order to produce the attributes suitable for use in the wine industry, core member 22 is formed from foam plastic material as described herein using a continuous extrusion process or a moulding process. Extrusion processes are preferred.

Figure 3:
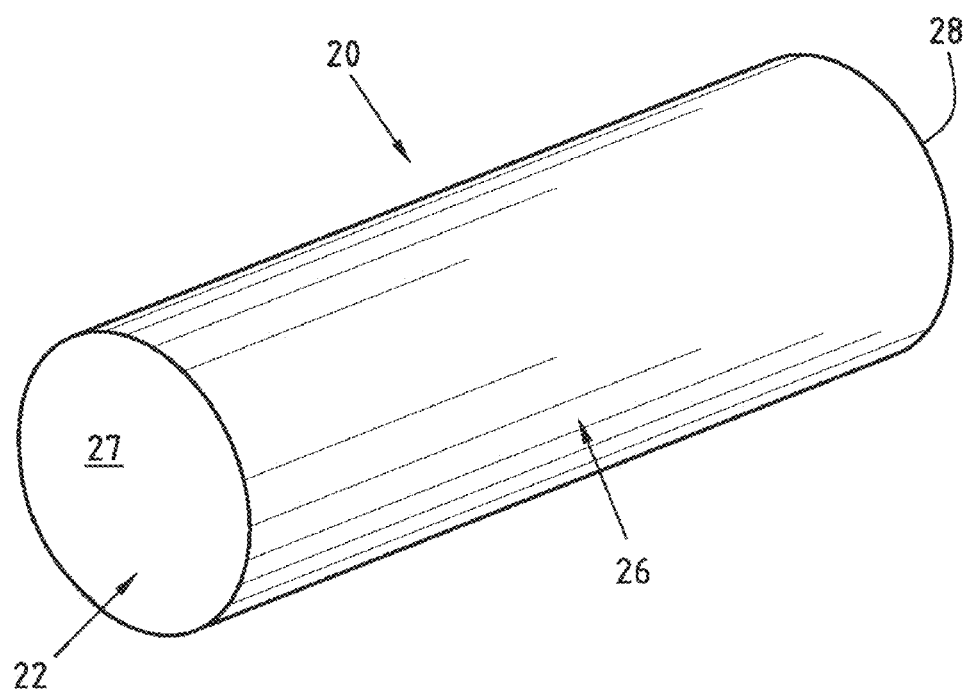
FIG. 3 is a perspective view of a closure according to an aspect of the present disclosure, not comprising a peripheral layer.

In FIG. 3, the exemplary construction of a closure 20 is depicted comprising a generally cylindrical shape formed by core member 22. In the exemplary aspect, core member 22 comprises a substantially cylindrically shaped surface 26, terminating with substantially flat end surfaces 27 and 28. In FIG. 3, closure 20 is shown without a peripheral layer. While closure 20 is depicted in FIG. 3 without a chamfered end, closure 20 can also be formed with chamfering.

Figure 4A:
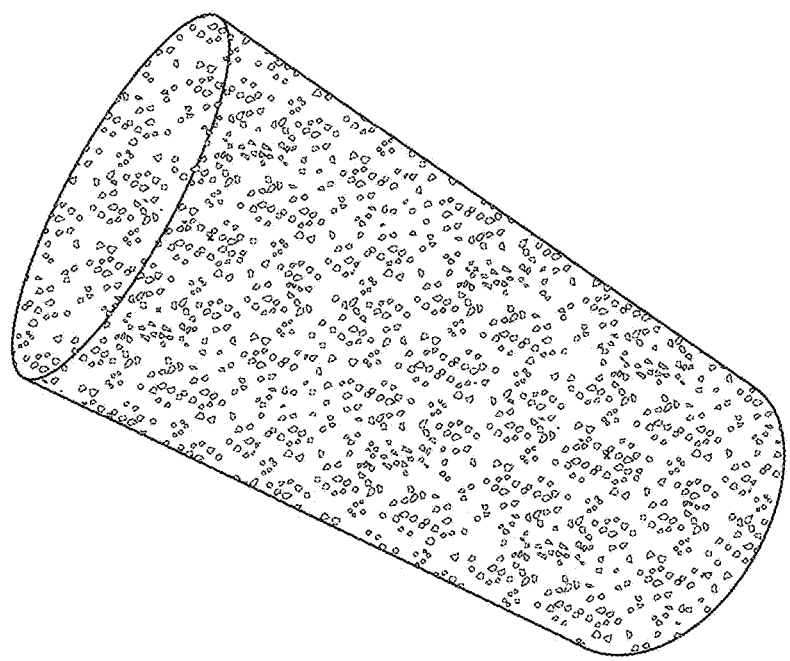
FIG. 4A is a drawing prepared from a photograph of an extruded closure according to an aspect of the present disclosure, not comprising a peripheral layer.
Figure 4B:
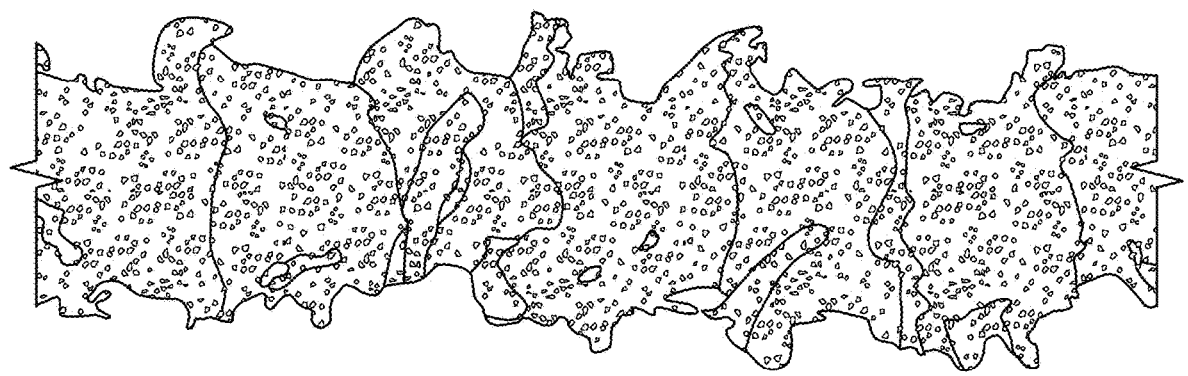
FIG. 4B is a drawing prepared from a photograph of a comparative extruded composition not according to an aspect of the present disclosure.

FIG. 4A shows a monoextruded cylindrical closure 20 according to the present invention, comprising a core member 22 and no peripheral layer. The closure 20 is formed from a composition according to the present invention, by means of a method according to the present invention. The cork particles are visible at both the peripheral surface 26 and the end surfaces 27, 28. FIG. 4B shows an extrudate formed in the same extrusion equipment, using the same process parameters, as the closure of FIG. 4A. The composition of the extrudate of FIG. 4B is, however, not according to the invention. In particular, the composition of FIG. 4B does not include a processing aid according to the invention.

While the Figures show cylindrical closures, closures for sparkling wine bottles are also encompassed by the invention. Apart from having a different shape, the outer appearance of sparkling wine bottle closures according to the present invention is the same as the closure of FIG. 4A.

In order to demonstrate the efficacy of the present disclosure, samples of bottle closures 20, manufactured in accordance with the present disclosure and having a foamed core member, or a foamed core member and a solid peripheral layer, were produced and tested. In the absence of processing aid as defined herein, a significant degree of surface melt fracture could be observed if the same processing parameters were used. In addition, the density of a core member that could be achieved in the absence of processing aid, was around 500 kg/m$^3$, whereas using processing aid according to the invention it was possible to achieve a core member density of 350 kg/m$^3$. The closure produced according to the invention and comprising processing aid additionally has a lighter colour, giving an appearance closer to a high quality natural cork closure.

Any embodiment or aspect described or defined herein, whether defining a closure, a composition, or a method, may be combined with any other aspect or embodiment, or any features thereof, whether defining a closure, a composition, or a method, even when such a combination is not explicitly stated. All combinations of embodiments, aspects and features are within the scope of the present invention. In particular, any aspect of any claim may be combined with any aspect of any one of more claims. Where numerical ranges are defined, any numerical limit of any range may be combined with any other numerical limit of the same range. For example, an upper limit of a range may be combined with an upper limit of a range, or a lower limit of a range may be combined with a lower limit of a range, or an upper limit of a range may be combined with a lower limit of a range, while remaining within the scope of the present invention.

Test Methods

The Mocon test for OTR/oxygen ingress rate was carried out using 100% oxygen according to ASTM F-1307.

Extraction Force

The test for extraction force was carried out on a random sample selection according to the methods described in WO 03/018304 A1 (extraction test, p. 48, l. 13—p. 49, l. 10), which are herewith incorporated and form part of the present disclosure. Three empty, clean "Bordeaux" style wine bottles were stoppered using a semi-automatic corking machine (Model 4040 from GAI S.p.A., Italy). The bottles were stored for one hour. The closures were then extracted at ambient temperature using a Dillon AFG-1000N force gauge (from Dillon/Quality Plus, Inc., USA) to measure the force required for extraction.

Surface Hardness

The surface hardness is tested at room temperature (25° C.) using a Shore 902 automatic operating stand from Instron according to ASTM D2240-10.

Coefficient of Friction

The dynamic coefficient of friction was measured according to ASTM D1894-14 at room temperature (25° C.) using an Instron Model 2810 Coefficient of Friction Testing Fixture. For the measurement of the dynamic coefficient of friction, a closure was split in half along its long axis and mounted to a steel plate with the flat side of the interior of the closure. This specimen was then loaded with 200 gram weight and pulled across a stainless steel surface at 15.2 cm/min.

Releasable Haloanisole

The amount of haloanisole released from a cork into wine can be measured as so-called "releasable haloanisole" by soaking a cork or a sample of corks in a wine for 24 hours for an untreated cork or 48 hours for a treated cork, and measuring the amount of each haloanisole compound in the wine by means of gas chromatography. An acceptable level is generally considered to be one which results in an amount of the respective chloroanisole or chloroanisoles in the wine which is below the average sensory threshold of about 6ng/L for TCA or TBA.

The invention claimed is:

1. A closure for a beverage-retaining container constructed for being inserted and securely retained in a portal-forming neck of said container, the closure comprising:
  (a) a plastic material comprising at least one thermoplastic polymer, wherein the at least one thermoplastic polymer comprises at least one polymer that is biodegradable according to ASTM D6400, and the at least one thermoplastic polymer is selected from the group consisting of: polyhydroxyalkanoates;
  copolymers of hydroxyalkanoates and monomers of biodegradable polymers;
  polylactic acid; copolymers of lactic acid and monomers of biodegradable polymers; polycaprolactone; polyglycolide; poly(3-hydroxybutyrate); poly(3-hydroxybutyrate-co-3-hydroxyvalerate); poly(3-hydroxybutyrate-co-3-hydroxyhexanoate); poly(butylenesuccinate); poly(butylenesuccinate-co-adipate); poly(trimethyleneterephthalate); poly(butylenadipate-co-terephthalate); poly(butylenesuccinate-co-terephthalate); poly(butylenesebacate-co-terephthalate); lactic acid caprolactone lactic acid copolymers; lactic acid ethylene oxide lactic acid copolymers; and combinations of any two or more thereof;
  (b) a plurality of particles comprising cork and having a particle size distribution $D_{50}$ measured by means of mechanical sieving according to ISO ICS 19.120 in a range of from 0.2 mm to 10 mm; and
  (c) two or more processing aids, comprising at least one processing aid that reduces the melt viscosity of the plastic material, and at least one processing aid that reduces the friction of the plastic material relative to at least one extruder surface during extrusion,
  wherein at atmospheric pressure at least one processing aid is solid at temperatures up to 160° C., and
  wherein the plurality of particles is distributed homogeneously throughout the closure.

2. The closure according to claim 1, wherein said closure comprises a plurality of cells.

3. The closure according to claim 2, wherein said plastic material comprises a polymer matrix that comprises the plurality of cells.

4. The closure according to claim 3, wherein at least one cell of the plurality of cells in the polymer matrix is defined by at least one cell wall facing an interior of the at least one cell, wherein at least a part of the at least one cell wall comprises a plastic material, and the plastic material of the at least a part of the at least one cell wall comprises a thermoplastic polymer of a composition that differs from a composition of a plastic material that forms a remainder of the polymer matrix.

5. The closure according to claim 2, wherein the plurality of cells comprises a plurality of substantially closed cells or a plurality of closed cells.

6. The closure according to claim 2, wherein the plurality of cells has an average cell size in a range of from about 0.025 mm to about 0.5 mm.

7. The closure according to claim 2, wherein at least one of a size or a distribution of the plurality of cells in the closure is substantially uniform throughout at least one of a length or a diameter of the closure.

8. The closure according to claim 1, wherein the closure has an overall density in a range of from 100 kg/m$^3$ to 500 kg/m$^3$.

9. The closure according to claim 1, wherein the plastic material has a foam density in a range of from 25 kg/m$^3$ to 800 kg/m$^3$.

10. The closure according to claim 1, wherein the plastic material is thermoplastically processable.

11. The closure according to claim 1, wherein a portion of the closure in a range of from 50% by weight to 100% by weight of the closure is biodegradable according to ASTM D6400, based on a total weight of the closure.

12. The closure according to claim 1, wherein the plurality of particles has a particle size distribution $D_{50}$ measured by means of mechanical sieving according to ISO ICS 19.120 in a range of from 0.5 mm to 5 mm.

13. The closure according to claim 1, wherein the two or more processing aids are selected from the group consisting of: fatty acid derivatives derived from a saturated or unsaturated fatty acid having from 12 to 45 carbon atoms; modified fatty acid derivatives derived from a modified, saturated or unsaturated fatty acid having from 12 to 45 carbon atoms; natural waxes; synthetic waxes; fatty acids; fatty acid esters; fatty acid amides; wax esters; ester waxes; plasticisers; alcohols; glycerol esters; polyol esters; polyol partial esters; polyglycol esters; fatty acid polyglycol esters; fatty acid polyglycol ethers; fatty alcohol polyglycol ethers; metallic soaps; fluoropolymers; polyols; silicones; glycerol monostearate; fatty acid esters of polyols; high molecular weight poly esters; and combinations of any two or more thereof.

14. The closure according to claim 1, wherein one or more of the two or more processing aids comprises at least one of the following properties:
   (i) a dropping point measured according to ASTM D2265 in a range of from 50° C. to 160° C.; or
   (ii) a specific gravity in a range of from 0.900 to 1.300, measured according to ASTM D1298-12b.

15. The closure according to claim 1, wherein components (a), (b) and (c) are present in the following weight percent amounts, based on a total weight of the closure:
   (a) 10 wt. % to 59.9 wt. % of the plastic material;
   (b) 40 wt. % to 85 wt. % of the plurality of particles; and
   (c) 0.1 wt. % to 10 wt. % of the two or more processing aids.

16. The closure according to claim 1, comprising at least one of the following conditions (i) to (iv): (i) the closure is devoid of a binder; (ii) the closure is devoid of a crosslinking agent; (iii) the closure is devoid of a binder and is devoid of a crosslinking agent; or (iv) the plastic material is not crosslinked by means of a crosslinking agent.

17. The closure according to claim 1, wherein the closure is formed by a process comprising extrusion.

18. The closure according to claim 1, wherein the closure is formed by a process comprising monoextrusion.

19. The closure according to claim 1, wherein the closure has an oxygen ingress rate measured according to ASTM F1307 of less than about 3 mg oxygen per container in a first 100 days after the container is closed with the closure.

20. The closure according to claim 1, wherein the closure has an oxygen ingress rate measured according to ASTM F1307 selected from the group consisting of less than about 1 mg oxygen, less than about 0.5 mg oxygen, less than about 0.25 mg oxygen, less than about 0.2 mg oxygen, and less than about 0.1 mg oxygen, per container in a first 100 days after the container is closed with the closure.

21. The closure according to claim 1, wherein the closure has an oxygen transfer rate measured according to ASTM F1307 in 100% oxygen of less than 0.05 cc/day.

22. The closure according to claim 1, wherein the closure has a content of releasable trichloroanisole of less than 6 ng/L.

23. The closure according to claim 1, being constructed for being inserted and securely retained in a portal-forming neck of a beverage-containing container embodying a wine bottle.

24. The closure according to claim 1, wherein the at least one thermoplastic polymer comprises poly (trimethyleneterephthalate).

25. A closure system comprising the closure according to claim 1 and a beverage-retaining container.

26. A composition for use in manufacturing a closure for a product-retaining container, the composition comprising:
   (a) a plastic material comprising at least one thermoplastic polymer, wherein the at least one thermoplastic polymer comprises at least one polymer that is biodegradable according to ASTM D6400, and the at least one thermoplastic polymer is selected from the group consisting of: polyhydroxyalkanoates; copolymers of hydroxyalkanoates and monomers of biodegradable polymers; polylactic acid; copolymers of lactic acid and monomers of biodegradable polymers; polycaprolactone; polyglycolide; poly (3-hydroxybutyrate); poly (3-hydroxybutyrate-co-3-hydroxyvalerate); poly (3-hydroxybutyrate-co-3-hydroxyhexanoate); poly (butylenesuccinate); poly (butylenesuccinate-co-adipate); poly (trimethyleneterephthalate); poly (butylenadipate-co-terephthalate); poly (butylenesuccinate-co-terephthalate); poly (butylenesebacate-co-terephthalate); lactic acid caprolactone lactic acid copolymers; lactic acid ethylene oxide lactic acid copolymers; and combinations of any two or more thereof;
   (b) a plurality of particles comprising cork and having a particle size distribution $D_{50}$ measured by mechanical sieving according to ISO ICS 19.120 in a range of from 0.2 mm to 10 mm;
   (c) two or more processing aids, comprising at least one processing aid that reduces the melt viscosity of the plastic material, and at least one processing aid that reduces the friction of the plastic material relative to at least one extruder surface during extrusion;
   (d) optionally, at least one additive; and
   (e) at least one blowing agent wherein at atmospheric pressure at least one processing aid is solid at temperatures up to 160° C., and wherein the plurality of particles is distributed homogeneously throughout the closure.

27. The composition according to claim 26, wherein components (a), (b), (c), (d) and (e) are present in the following weight percent amounts, based on a total weight of the composition:
   (a) 10 wt. % to 59.8 wt. % of the plastic material;
   (b) 40 wt. % to 85 wt. % of the plurality of particles;
   (c) 0.1 wt. % to 10 wt. % of the two or more processing aids;
   (d) 0 wt. % to 10 wt. % of the at least one additive; and
   (e) 0.1 wt. % to 10 wt. % of the at least one blowing agent.

28. The composition according to claim 26, wherein the at least one blowing agent is selected from the group consisting of expandable microspheres, chemical blowing agents, physical blowing agents, and combinations of two or more thereof.

29. A method for obtaining a composition for use in manufacturing a closure for a product-retaining container, the method comprising intimately combining the following components:
   (a) a plastic material comprising at least one thermoplastic polymer, wherein the at least one thermoplastic polymer comprises at least one polymer that is biodegradable according to ASTM D6400, and the at least one thermoplastic polymer is selected from the group consisting of: polyhydroxyalkanoates; copolymers of hydroxyalkanoates and monomers of biodegradable polymers; polylactic acid; copolymers of lactic acid and monomers of biodegradable polymers; polycaprolactone; polyglycolide; poly(3-hydroxybutyrate); poly(3-hydroxybutyrate-co-3-hydroxyvalerate); poly(3-hydroxybutyrate-co-3-hydroxyhexanoate); poly(butylenesuccinate); poly(butylenesuccinate-co-adipate); poly(trimethyleneterephthalate); poly(butylenadipate-co-terephthalate); poly(butylenesuccinate-co-terephthalate); poly(butylenesebacate-co-terephthalate); lactic acid caprolactone lactic acid copolymers; lactic acid ethylene oxide lactic acid copolymers; and combinations of any two or more thereof;
(b) a plurality of particles comprising cork and having a particle size distribution $D_{50}$ measured by means of mechanical sieving according to ISO ICS 19.120 in a range of from 0.2 mm to 10 mm;
c) two or more processing aids;
(d) optionally, at least one additive; and
(e) at least one blowing agent wherein at atmospheric pressure at least one processing aid is solid at temperatures up to 160° C., and wherein the plurality of particles is distributed homogeneously throughout the closure.

30. The method according to claim 29, wherein the components (a), (b), (c), (d) and (e) are present in the following weight percent amounts, based on a total weight of the composition:
(a) 10 wt. % to 59.8 wt. % of the plastic material;
(b) 40 wt. % to 85 wt. % of the plurality of particles;
(c) 0.1 wt. % to 10 wt. % of the two or more processing aids;
(d) 0 wt. % to 10 wt. % of the at least one additive; and
(e) 0.1 wt. % to 10 wt. % of the at least one blowing agent.

31. A composition obtainable by the method according to claim 29.

32. A method for manufacturing a closure for a product-retaining container constructed for being inserted and securely retained in a portal-forming neck of said container, said method comprising as method steps:
i. intimately combining the following components, to form a composition:
(a) a plastic material comprising at least one thermoplastic polymer, wherein the at least one thermoplastic polymer comprises at least one polymer that is biodegradable according to ASTM D6400, and the at least one thermoplastic polymer is selected from the group consisting of: polyhydroxyalkanoates; copolymers of hydroxyalkanoates and monomers of biodegradable polymers; polylactic acid; copolymers of lactic acid and monomers of biodegradable polymers; polycaprolactone; polyglycolide; poly(3-hydroxybutyrate); poly(3-hydroxybutyrate-co-3-hydroxyvalerate); poly(3-hydroxybutyrate-co-3-hydroxyhexanoate); poly(butylenesuccinate); poly(butylenesuccinate-co-adipate); poly(trimethyleneterephthalate); poly(butylenadipate-co-terephthalate); poly(butylenesuccinate-co-terephthalate); poly(butylenesebacate-co-terephthalate); lactic acid caprolactone lactic acid copolymers; lactic acid ethylene oxide lactic acid copolymers; and combinations of any two or more thereof;
(b) a plurality of particles comprising cork and having a particle size distribution $D_{50}$ measured by means of mechanical sieving according to ISO ICS 19.120 in a range of from 0.2 mm to 10 mm;
(c) two or more processing aids, comprising at least one processing aid that reduces the melt viscosity of the plastic material, and at least one processing aid that reduces the friction of the plastic material relative to at least one extruder surface during extrusion;
(d) optionally, at least one additive; and
(e) at least one blowing agent wherein at atmospheric pressure at least one processing aid is solid at temperatures up to 160° C., and wherein the plurality of particles is distributed homogeneously throughout the closure;
ii. heating the composition obtained in step i. to form a melt;
iii. forming, by means of extrusion or molding, a closure precursor from the melt obtained in step ii.; and
iv. optionally cutting and/or finishing the closure precursor to form the closure.

33. The method according to claim 32, wherein the at least one blowing agent is selected from the group consisting of expandable microspheres, chemical blowing agents, physical blowing agents, and combinations of two or more thereof.

34. The method according to claim 32, wherein during step ii. the plastic material is foamed.

35. The method according to claim 32, wherein the components (a), (b), (c), (d) and (e) are present in the following weight percent amounts, based on a total weight of the composition:
(a) 10 wt. % to 59.8 wt. % of the plastic material;
(b) 40 wt. % to 85 wt. % of the plurality of particles;
(c) 0.1 wt. % to 10 wt. % of the two or more processing aids;
(d) 0 wt. % to 10 wt. % of the at least one additive; and
(e) 0.1 wt. % to 10 wt. % of the at least one blowing agent.

36. A closure obtained by the method according to claim 32.

* * * * *